United States Patent [19]
Inagaki et al.

[11] Patent Number: 5,998,125
[45] Date of Patent: Dec. 7, 1999

[54] PHOTOTHERMOGRAPHIC MATERIAL

[75] Inventors: Yoshio Inagaki; Hirohiko Tsuzuki, both of Kanagawa, Japan

[73] Assignee: Fuji Photo Film Co., Ltd., Kanagawa, Japan

[21] Appl. No.: 08/949,694

[22] Filed: Oct. 15, 1997

[30] Foreign Application Priority Data

Oct. 15, 1996 [JP] Japan .................................. 8-293332

[51] Int. Cl.$^6$ .............................. G03C 1/12; G03C 1/498
[52] U.S. Cl. ........................ 430/584; 430/583; 430/585; 430/619
[58] Field of Search .................... 430/619, 584, 430/583, 585

[56] References Cited

U.S. PATENT DOCUMENTS

| | | | |
|---|---|---|---|
| 5,393,654 | 2/1995 | Burrows et al. | 430/584 |
| 5,541,054 | 7/1996 | Miller et al. | 430/619 |
| 5,587,279 | 12/1996 | Mifune et al. | 430/567 |
| 5,677,121 | 10/1997 | Tsuzuki . | |
| 5,763,153 | 6/1998 | Tsusuki et al. | 430/584 |

*Primary Examiner*—Thorl Chea
*Attorney, Agent, or Firm*—Birch, Stewart, Kolasch & Birch, LLP

[57] ABSTRACT

A photothermographic material comprising at least one layer containing photosensitive silver halide grains on a support further contains a mono-, tri- or penta-methine cyanine dye having a thienyl or arylthio substituent. The material shows low fog, high sensitivity, and improved age stability.

15 Claims, No Drawings

PHOTOTHERMOGRAPHIC MATERIAL

BACKGROUND OF THE INVENTION

This invention relates to a photothermographic material.

From the contemporary standpoints of environmental protection and space saving, it is strongly desired to reduce the quantity of spent solution. Needed in this regard is a technology relating to thermographic photosensitive materials for use in medical diagnosis and general photography which can be effectively exposed by means of laser image setters and laser imagers and produce distinct black images having high resolution and sharpness. These thermographic photosensitive materials offer to the customer a simple thermographic system which eliminates a need for solution type chemical agents and is not detrimental to the environment.

On the other hand, the recent rapid progress of semiconductor laser technology has made it possible to reduce the size of medical image output devices. As a matter of course, there were developed techniques relating to infrared-sensitive photothermal silver halide photographic material which can utilize a semiconductor laser as a light source. The spectral sensitization technique is disclosed, for example, in JP-B 10391/1991 and 52387/1994, JP-A 341432/1993, 194781/1994, and 301141/1994. The antihalation technique is disclosed, for example, in JP-A 13295/1995 and U.S. Pat. No. 5,380,635. Since the infrared exposure system permits the visible absorption of sensitizing dyes and antihalation dyes to be considerably reduced, a substantially colorless photosensitive material can be readily produced.

Since spectral sensitizing dyes capable of absorbing infrared radiation, however, generally have a high reducing power due to a high HOMO (highest occupied molecular orbital), they tend to reduce silver ions in photosensitive materials to exacerbate the fog thereof. In particular, these photosensitive materials experience a substantial change of performance during storage under hot humid conditions and long-term storage. If dyes having a low HOMO are used for preventing deterioration of storage stability, spectral sensitization efficiency and sensitivity become low because their LUMO (lowest unoccupied molecular orbital) is relatively low. These problems relating to sensitivity and storage stability arise not only with wet photographic photosensitive materials, but more outstandingly with photothermographic materials.

The reducing power of a dye, of course, tends to increase as its amount becomes larger. A photosensitive material containing a small amount of dye, however, shows short sensitivity because incident light to the photosensitive material is not fully absorbed. Especially in a photothermographic material using a highly lipophilic binder, the adsorption of the dye to a silver halide or photosensitive element is weak, and the sensitivity becomes short unless the dye is added in a sufficient amount.

It is believed that such inconvenience can be mitigated by using a sensitizing dye capable of absorbing light of shorter wavelength. Therefore, there is a need for a photosensitive material suitable for exposure by a red laser rather than an infrared laser. However, in a photothermographic material containing an organic silver salt, the use of a sensitizing dye capable of absorbing red laser light mitigates the problems as compared with the use of infrared dyes, but the occurrence of fog to a practically noticeable extent and performance variations during storage still remain unsolved.

SUMMARY OF THE INVENTION

An object of the invention is to provide a photothermographic material having the advantages of age stability, low fog, and high sensitivity.

According to the invention, there is provided a photothermographic material comprising at least one layer containing photosensitive silver halide grains on a support, the material further comprising a cyanine dye of the following general formula (I):

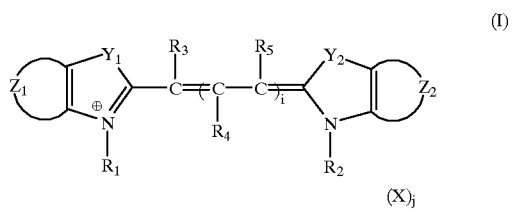

(I)

wherein each of $Z_1$ and $Z_2$ is a group of atoms necessary to complete a benzene or naphthalene ring, each of $Y_1$ and $Y_2$ is O, S, Se or NR wherein R is alkyl, each of $R_1$ and $R_2$ is alkyl, each of $R_3$, $R_4$, and $R_5$ is hydrogen or a monovalent substituent, letter i is 0, 1 or 2, when i is 2, two $R_4$ groups may be identical or different or form a 5- or 6-membered ring, taken together, and two $R_5$ groups may be identical or different or form a 5- or 6-membered ring, taken together, X is a counter ion for maintaining an equilibrium of electric charge, and letter j is 0 or 1. At least one member selected from the class consisting of a substituent on $R_2$ a substituent on $R_1$, a substituent on $R_2$, a substituent on the ring completed by $Z_1$, a substituent on the ring completed by $Z_2$, and monovalent substituents represented by $R_3$ to $R_5$ has at least one thienyl or arylthio group.

Preferably the at least one layer contains a binder, an organic silver salt, and a reducing agent for silver ion as well as the photosensitive silver halide grains.

DESCRIPTION OF THE PREFERRED EMBODIMENTS

According to the invention, photosensitive silver halide grains are spectrally sensitized to red light, especially in the wavelength region of 600 to 700 nm, using a cyanine dye of the general formula (I). There is thus obtained a photothermographic material which is suitable for exposure to red light, especially a red laser beam typically having a wavelength of 630 to 680 nm, has high sensitivity and low fog, and is aging stable. High contrast images are obtained when the photothermographic material further contains a hydrazine derivative.

The general formula (I) is described in detail. The cyanine dye of formula (I) is structurally characterized by containing at least one of a thienyl group and an arylthio group in a molecule.

In formula (I), each of $Z_1$ and $Z_2$, which may be identical or different, is a group of atoms necessary to complete a benzene or naphthalene ring. Preferably, at least one ring is a benzene ring. More preferably, both the rings are benzene rings.

The benzene or naphthalene ring completed by $Z_1$ and $Z_2$ may further have a substituent. Preferred substituents include thienyl and arylthio groups to be described later, alkyl groups having 1 to 6 carbon atoms, substituted phenyl groups having 6 to 10 carbon atoms (preferred substituents including halogen, alkoxy, alkyl, alkylthio, carboxyalkyl, and carboxy), phenyl groups, alkoxy groups having 1 to 6 carbon atoms, alkylthio groups having 1 to 6 carbon atoms (e.g., methylthio), sulfonyl groups having 1 to 8 carbon atoms (e.g., morpholinosulfonyl), and halogen atoms (e.g., F, Cl, Br and I). The condensed position of the naphthalene ring completed by $Z_1$ and $Z_2$ may be [1,2-d], [2,3-d] or [3,4-d].

Each of $Y_1$ and $Y_2$ is O, S, Se or NR wherein R is an alkyl group. The alkyl group represented by R may have a thienyl or arylthio group as a substituent and its examples and preferred examples are the same as the alkyl group represented by $R_1$ and $R_2$ to be described later. The alkyl group represented by R is desirably selected from those having 1 to 8 carbon atoms, for example, methyl, ethyl, octyl and benzyl.

Each of $R_1$ and $R_2$, which may be identical or different, is an alkyl group. The alkyl group represented by $R_1$ or $R_2$ is preferably selected from normal, branched or cyclic alkyl groups having 1 to 22 carbon atoms, which may further have a substituent. Preferred substituents include thienyl and arylthio groups to be described later, halogen atoms (e.g., F, Cl, Br and I), hydroxy groups, carboxy groups, carboxylate groups, sulfo groups, sulfonate groups, alkoxycarbonyl groups having 2 to 20 carbon atoms, acyl groups having 2 to 20 carbon atoms, acyloxy groups having 2 to 20 carbon atoms, carboxylic acid amide groups having 1 to 20 carbon atoms, carbamoyl groups having 1 to 20 carbon atoms, alkoxy groups having 1 to 20 carbon atoms, substituted phenyl groups having 6 to 10 carbon atoms, phenyl groups, alkylthio groups having 1 to 20 carbon atoms (e.g., methylthio), and aryloxy groups having 6 to 20 carbon atoms (e.g., naphthyloxy). Preferred alkyl groups represented by $R_1$ or $R_2$ are unsubstituted normal alkyl groups having 1 to 8 carbon atoms, carboxyalkyl groups having 2 to 8 carbon atoms, alkylthioalkyl groups having 2 to 8 carbon atoms, thienylalkyl groups having 5 to 10 carbon atoms, and arylthioalkyl groups having 7 to 10 carbon atoms.

Each of $R_3$, $R_4$, and $R_5$ is hydrogen or a monovalent substituent. Preferred monovalent substituents represented by $R_3$ to $R_5$ are alkyl groups having 1 to 8 carbon atoms (e.g., methyl and ethyl), alkoxy groups having 1 to 8 carbon atoms, phenyl groups, substituted phenyl groups having 6 to 10 carbon atoms, phenoxy groups, substituted phenoxy groups having 6 to 10 carbon atoms, aralkyl groups having 7 to 11 carbon atoms, amino groups, substituted amino groups (substituents, taken together, may form a ring, e.g., dimethylamino, diphenylamino, morpholino, and 4-acetylpiperazinyl), and nitrogenous hetero-aromatic ring groups (e.g., 1-pyrazolyl and 1-imidazolyl). The monovalent substituent represented by $R_3$ to $R_5$ may have a thienyl or arylthio group. Most preferably, $R_3$ and $R_5$ at opposite ends of the methine chain are hydrogen.

Letter i is equal to 0, 1 or 2. The methine chains corresponding to i=0, 1 and 2 are represented by the following formula (L1), (L3), and (L5), respectively.

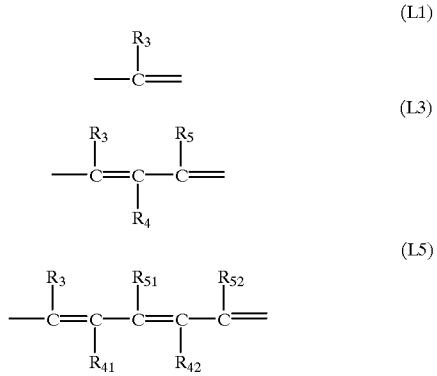

It is noted that $R_3$ in formula (L1), $R_3$ to $R_5$ in formula (L3), and $R_3$, $R_{41}$, $R_{42}$, $R_{51}$, and $R_{52}$ in formula (L5) are as previously defined for $R_3$ to $R_5$.

In the pentamethine chain of formula (L5), that is, when i is 2, a combination of $R_{41}$ and $R_{42}$ (corresponding to $R_4$ and $R_4$ in formula (I), which may be identical or different) or a combination of $R_{51}$ and $R_{52}$ (corresponding to $R_5$ and $R_5$ in formula (I), which may be identical or different) may form a 5- or 6-membered ring when taken together. The ring that such a combination forms with a part of the methine chain includes a carbon ring (e.g., cyclohexene and cyclopentene) and a heterocycle containing an oxygen, sulfur or nitrogen atom as a hetero atom (e.g., 2H,6H-thiopyran), which may further have a substituent. Preferred examples of the substituent include alkyl groups having 1 to 4 carbon atoms, alkoxy groups having 1 to 4 carbon atoms, phenyl groups, substituted phenyl groups having 6 to 10 carbon atoms, amino groups, substituted amino groups (substituents, taken together, may form a ring, e.g., dimethylamino, diphenylamino, morpholino, and 4-acetylpiperazinyl), and nitrogenous hetero-aromatic ring groups (e.g., 1-pyrazolyl and 1-imidazolyl).

In the general formula (I), a thienyl or arylthio group is contained as a substituent on the ring completed by $Z_1$ and/or the ring completed by $Z_2$, a substituent on the alkyl group represented by R, a substituent on the alkyl group represented by $R_1$ and/or $R_2$, or the monovalent substituents represented by $R_3$ to $R_5$ (inclusive of $R_{41}$, $R_{42}$, $R_{51}$ and $R_{52}$ in formula (L5)) or as a substituent on these substituents. Preferably, a thienyl or arylthio group is contained as a substituent on the ring completed by $Z_1$ and/or $Z_2$, or a substituent on the alkyl group represented by $R_1$ and/or $R_2$. Most preferably, a thienyl or arylthio group is contained as a substituent on the ring completed by $Z_1$ and/or $Z_2$.

The thienyl group used herein is either 2-thienyl or 3-thienyl. Although an unsubstituted thienyl group is preferred, the thienyl group may have a substituent, examples of which include alkyl groups having 1 to 6 carbon atoms, substituted phenyl groups having 6 to 10 carbon atoms (preferred substituents including halogen, alkoxy, alkyl, alkylthio, carboxyalkyl and carboxy), phenyl groups, alkoxy groups having 1 to 6 carbon atoms, alkylthio groups having 1 to 6 carbon atoms, and halogen atoms (e.g., F, Cl, Br and I).

The arylthio group is preferably a substituted phenylthio group having 6 to 10 carbon atoms (preferred substituents including halogen, alkoxy, alkyl, alkylthio, carboxyalkyl and carboxy) or a phenylthio group. The phenylthio is most preferred.

X is a counter ion for maintaining an equilibrium of electric charge, and letter j is 0 or 1. The counter ion represented by X is a cation or anion which is selected such that the total of electric charges in the compound of the general formula (I) is zero. The counter ion may be present as a substituent on $Z_1$, $Z_2$, $R_1$, $R_2$ or the like.

Examples of the cation include $Na^+$, $K^+$, $NH_4^+$, $(n-C_4H_9)_4 N^+$, and N-ethylpyridinium. Examples of the anion include acid anions such as chloride, bromide, iodide, tetrafluoroborate, hexafluorophosphate, methylsulfate, ethylsulfate, 4-methyl-benzenesulfonate, 4-chlorobenzenesulfonate, benzenesulfonate, methanesulfonate, and trifluoromethanesulfonate.

The cyanine dye of the general formula (I) is preferably represented by the following general formula (Ia):

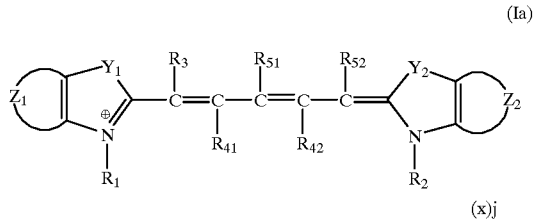

(Ia)

wherein each of $Z_1$ and $Z_2$ is a group of atoms to complete a benzene ring, each of $Y_1$ and $Y_2$ is O, S, Se or NR wherein R is an alkyl group, at least one of $Y_1$ and $Y_2$ are S. Each of $R_1$ and $R_2$ is an unsubstituted alkyl having 2 to 6 carbon atoms or carboxyalkyl. $R_3$, $R_{41}$, $R_{42}$, $R_{52}$, and $R_{52}$ is hydrogen or a monovalent substituent. $R_{41}$ and $R_{42}$ may form a 5- or 6-membered ring, taken together. $R_{51}$ and $R_{52}$ may form a 5- or 6-membered ring, taken together. X is a counter ion for maintaining a balance of electric charge, and letter j is 0 or 1. At least one member selected from the class consisting of substituents on $R_1$, $R_2$, $Z_1$, $Z_2$, $R_3$, $R_{41}$, $R_{42}$, $R_{51}$ and $R_{52}$ has at least one thienyl or arylthio group.

In the general formula (Ia), the substituents $R_{41}$ and $R_{42}$ or $R_{51}$ and $R_{52}$ preferably form a 5- or 6-membered ring. Preferably, the at least one member selected from the class consisting of substituents on $Z_1$ and $Z_2$ has at least one thienyl or arylthio group. Preferably each of $Z_1$ and $Z_2$ is a group of atoms to complete a benzene ring having a thienyl or arylthio group.

When expressed by a combination of structural moieties, the preferred compounds of formula (I) or (Ia) are pentamethine cyanine dyes wherein each of $Z_1$ and $Z_2$ is a group of atoms to complete a benzene ring having a thienyl or arylthio group, one of $Y_1$ and $Y_2$ is S and the other is O or S, especially both $Y_1$ and $Y_2$ are S, each of $R_1$ and $R_2$ is an unsubstituted alkyl having 2 to 6 carbon atoms or carboxyalkyl, and i=2. With respect to the formula (L5), it is preferred that at least one of the combination of $R_{41}$ with $R_{42}$ and the combination of $R_{51}$ with $R_{52}$ form a 5- or 6-membered ring, especially a 6-membered carbon ring.

Illustrative, non-limiting examples of the compound of the general formula (I) are given below as D-1 through D-43.

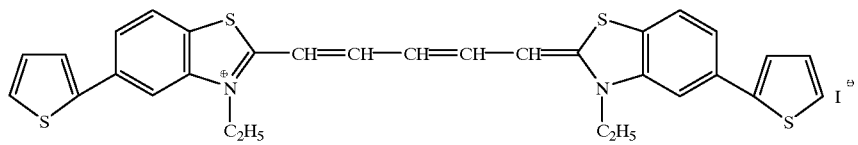

D-1

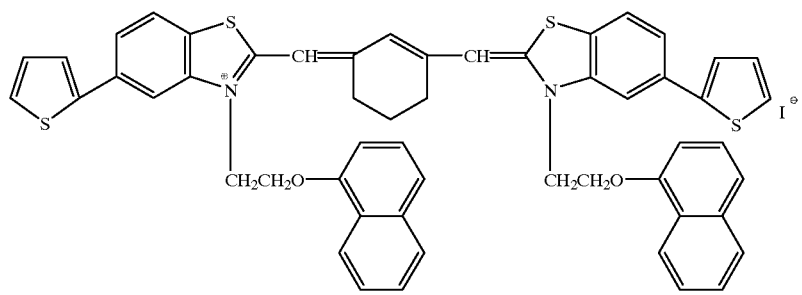

D-2

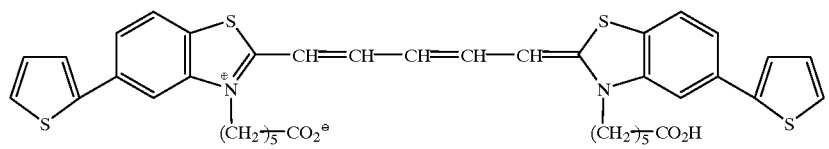

D-3

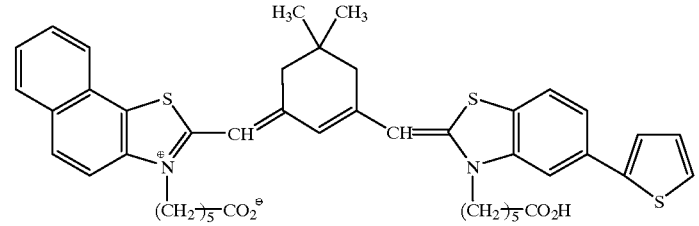

D-4

-continued
D-5
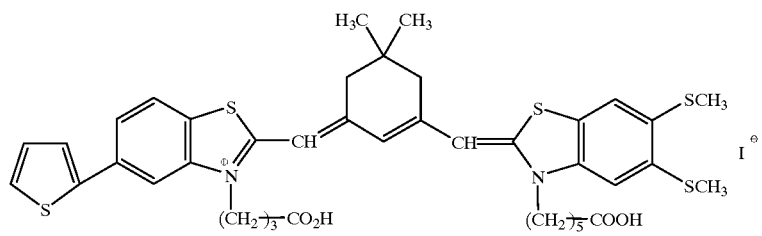
D-6
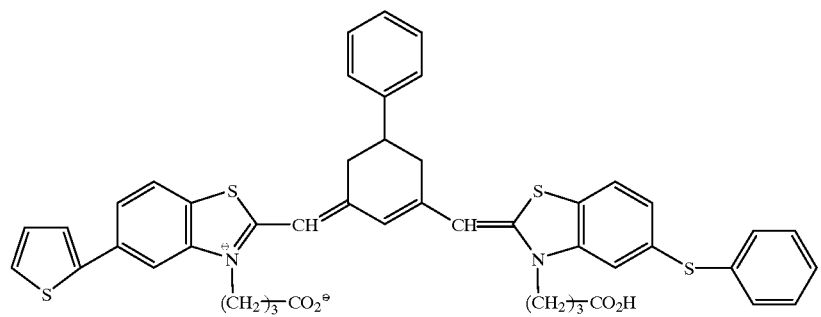
D-7
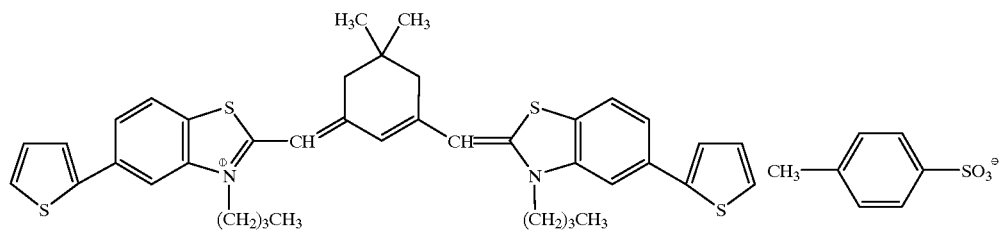
D-8
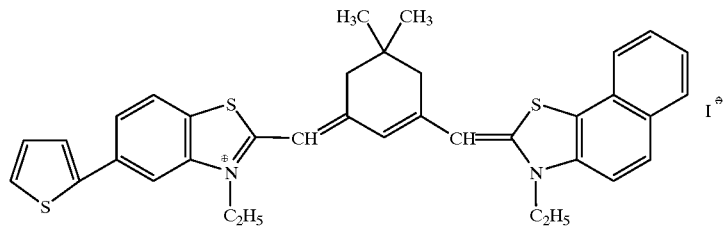
D-9
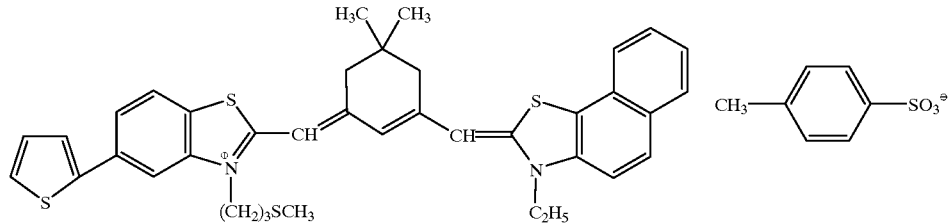
D-10
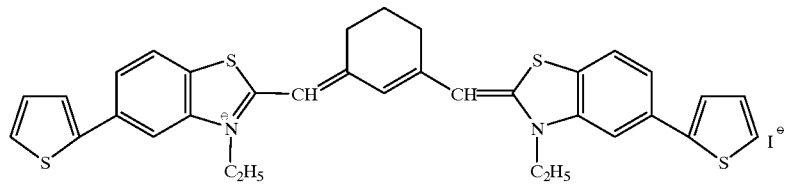

-continued
D-11
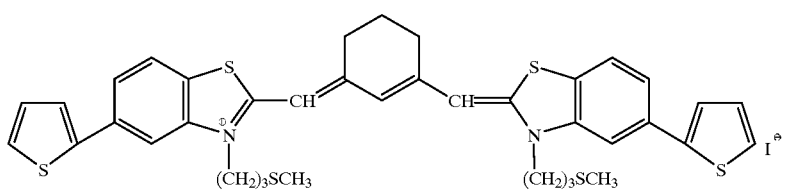
D-12
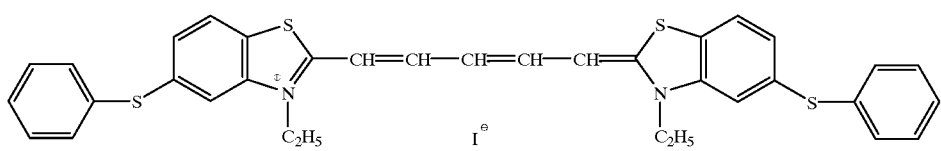
D-13
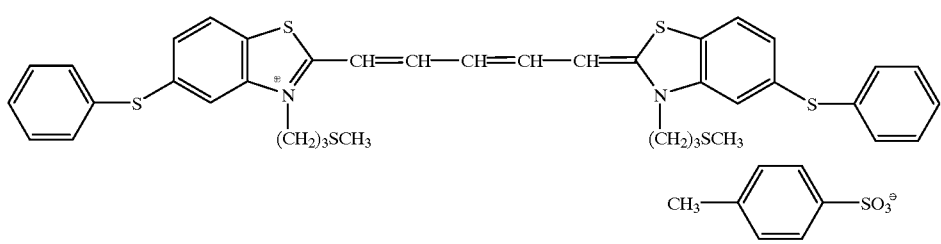
D-14
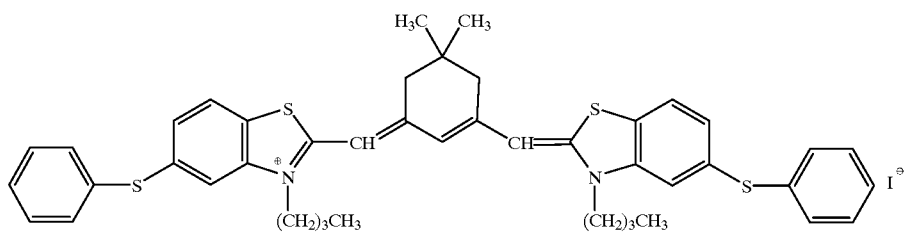
D-15
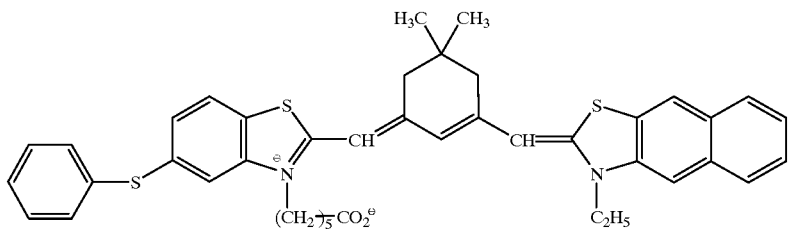
D-16
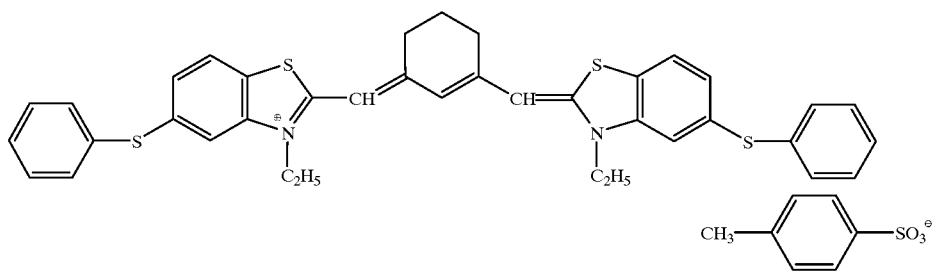

-continued
D-17
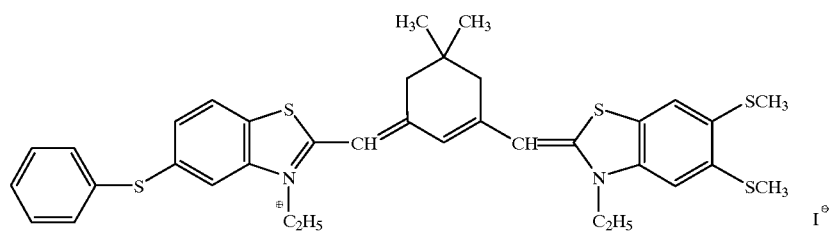
D-18
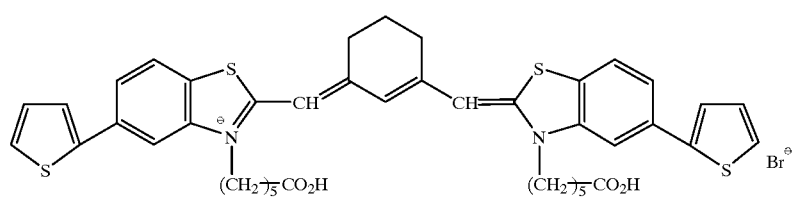
D-19
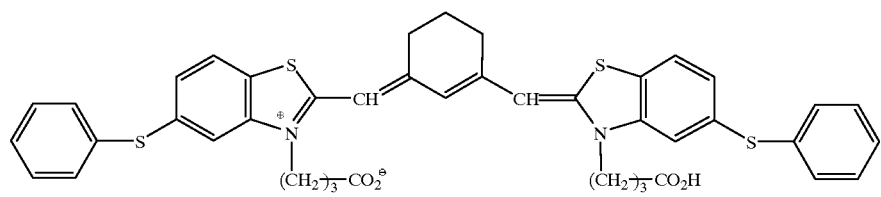
D-20
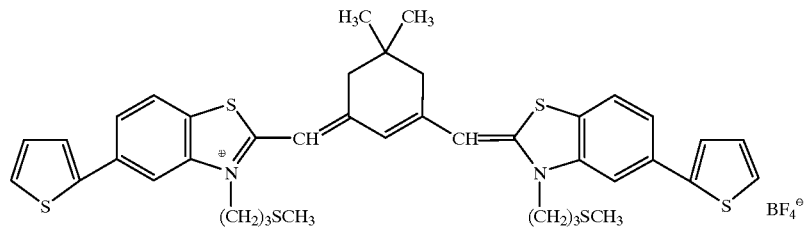
D-21
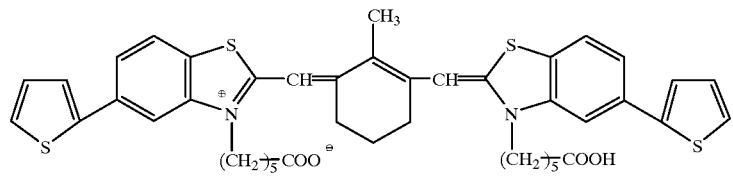
D-22
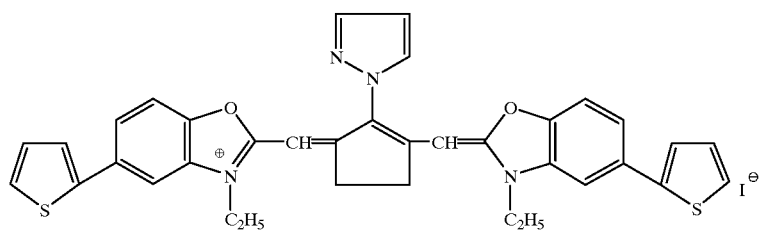
D-23
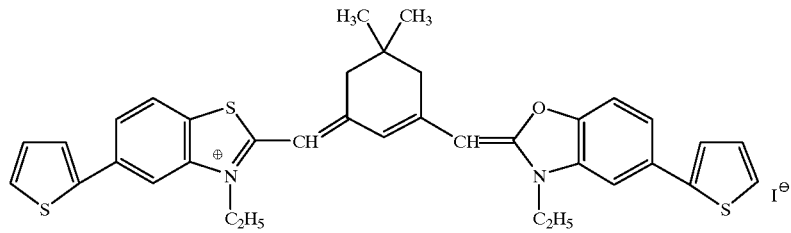

D-24
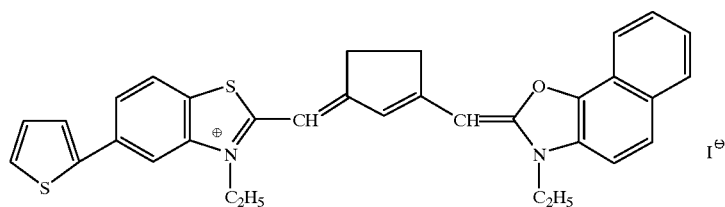
D-25
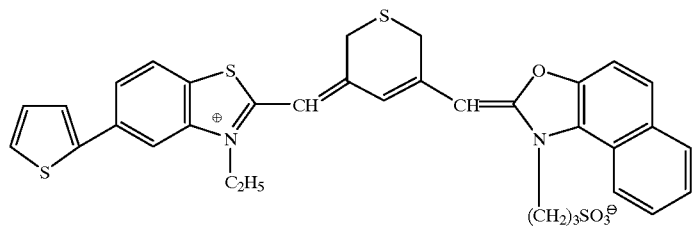
D-26
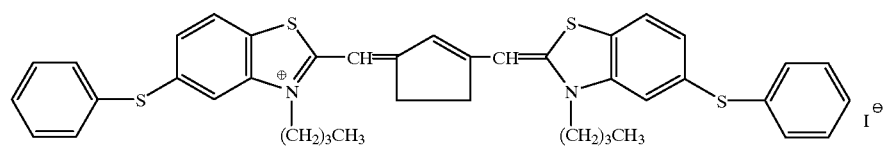
D-27
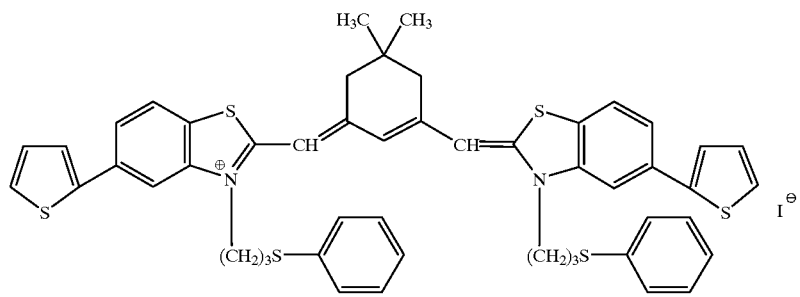
D-28
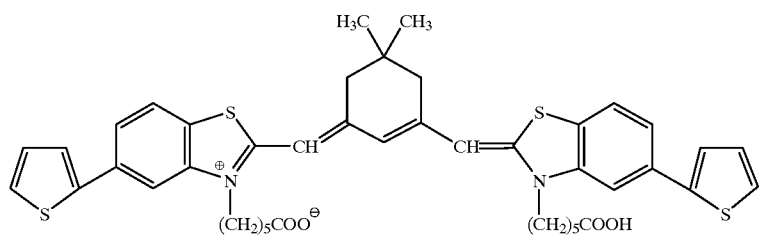
D-29
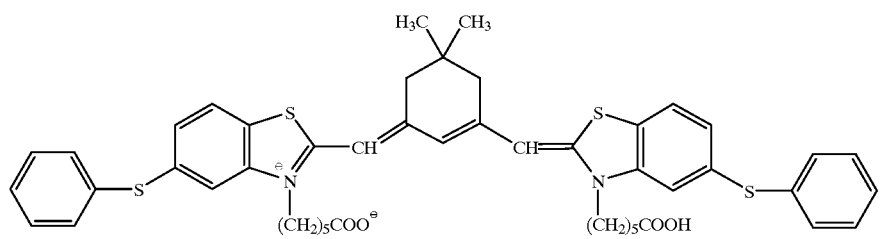
D-30
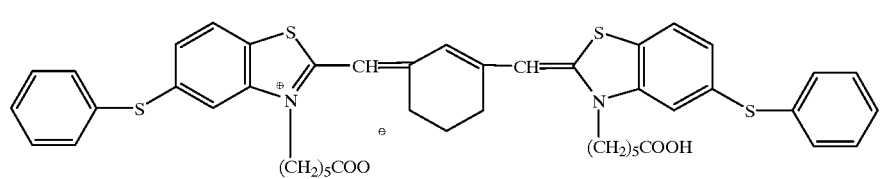

-continued
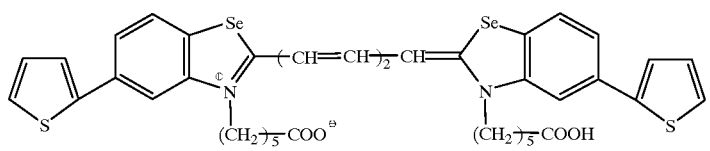
D-31
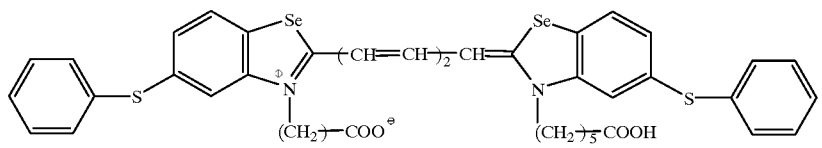
D-32
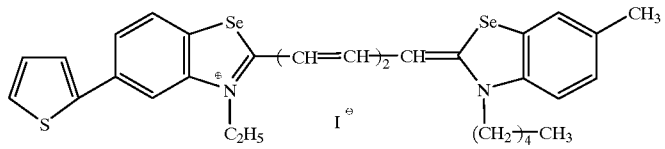
D-33
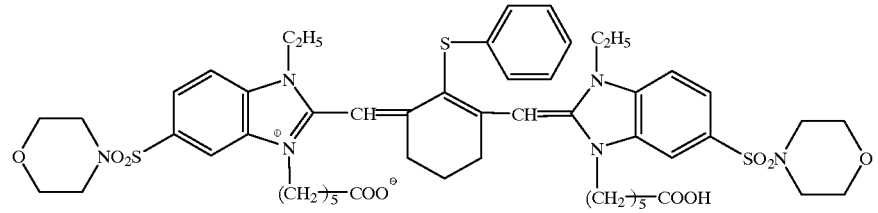
D-34
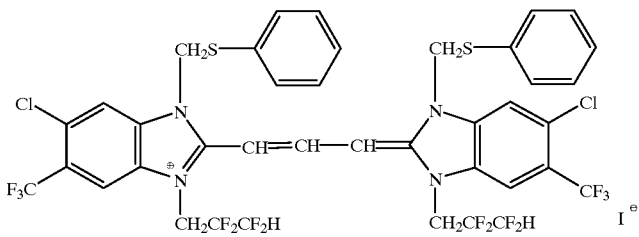
D-35
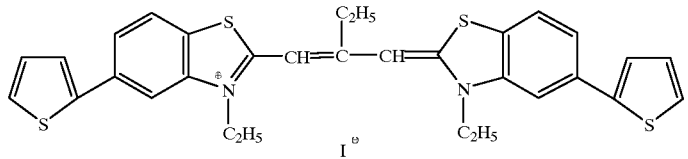
D-36
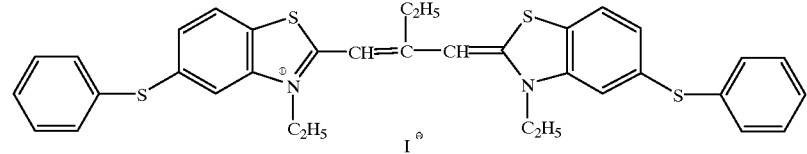
D-37
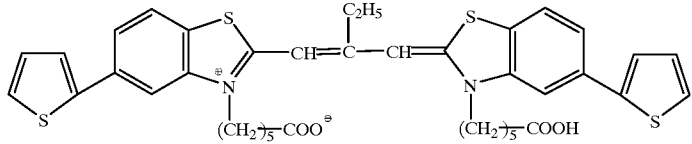
D-38

-continued

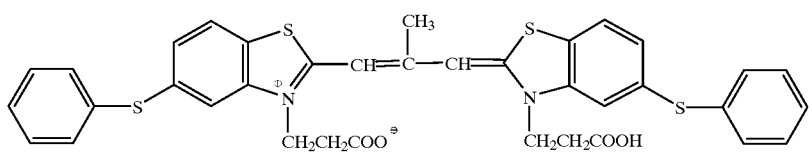
D-39

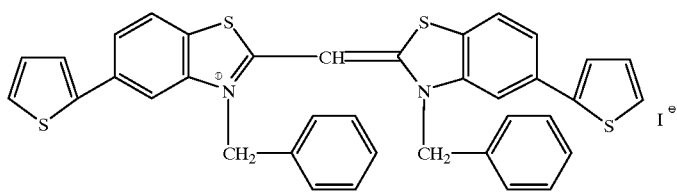
D-40

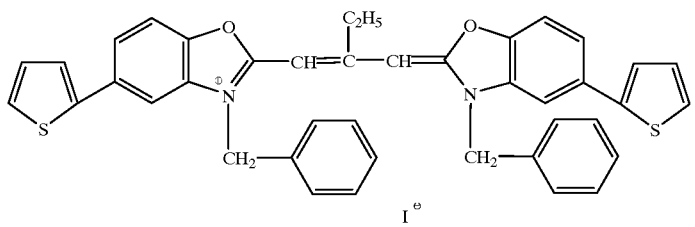
D-41

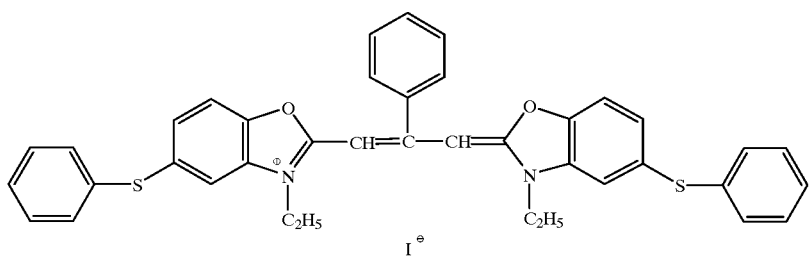
D-42

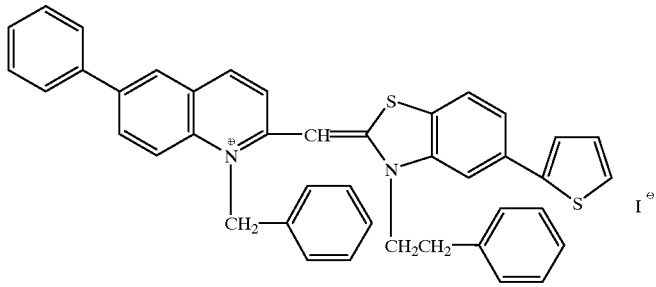
D-43

The compounds of the general formula (I) can be synthesized by known methods as described in the following literature and references cited therein. F. M. Hammer, "The Cyanine Dyes and Related Compounds," Interscience Publishers, N.Y., 1964, page 55 ff.; Nikolai Tyutyulkov, Jurgen Fabian, Achim Ulehlhorn, Fritz Dietz, and Alia Tadjer, "Polymethine Dyes", St. Kliment Ohridski University Press, Sophia, pp. 23–38; D. M. Sturmer, "Heterocyclic Compounds-Special topics in heterocyclic chemistry-," Chap. 18, Section 14, pp. 482–515, John Wiley & Sons, New York and London, 1977; "Rodd's Chemistry of Carbon Compounds," 2nd Ed., Vol. IV, part B, 1977, Chap. 15, pp. 369–422, 2nd Ed., Vol. IV, part B, 1985, Chap. 15, pp. 267–296, Elsvier Science Publishing Company Inc., New York.

The cyanine dyes of the general formula (I) may be used alone or in admixture of two or more and preferably in an amount of $10^{-6}$ to 1 mol, more preferably $10^{-5}$ to $10^{-2}$ mol per mol of silver halide.

The cyanine dye may be added at any stage from the formation of silver halide to immediately before coating, preferably immediately before coating.

In the practice of the invention, two or more cyanine dyes may be used so as to provide a desired spectral sensitization spectrum.

Another sensitizing dye may be used in combination with the cyanine dye of the general formula (I). The additional sensitizing dye of a structure other than formula (I) is preferably one which can spectrally sensitize silver halide grains in a wavelength region of the exposure wavelength range when adsorbed to the silver halide grains. More specifically, photosensitive silver halide can be spectrally advantageously sensitized with various known dyes including cyanine, merocyanine, styryl, hemicyanine, oxonol, hemioxonol and xanthene dyes. Useful cyanine dyes are cyanine dyes having a basic nucleus such as a thiazoline, oxazoline, pyrroline, pyridine, oxazole, thiazole, selenazole and imidazole nucleus. Preferred examples of the useful merocyanine dye contain an acidic nucleus such as a thiohydantoin, rhodanine, oxazolidinedione, thiazolinedione, barbituric acid, thiazolinone, malononitrile, and pyrazolone nucleus in addition to the above-mentioned basic nucleus. Among the above-mentioned cyanine and merocyanine dyes, those having an imino or carboxyl group are especially effective. A suitable choice may be made of well-known dyes as described, for example, in U.S. Pat. Nos. 3,761,279, 3,719,495, and 3,877,943, UKP 1,466,201, 1,469,117, and 1,422,057, JP-B 10391/1991 and 52387/1994, JP-A 341432/1993, 194781/1994, and 301141/1994. The additional dye may be used in an amount of about 10 $\mu$mol to about 1 mol per mol of silver halide. Two or more dyes may be used so as to provide a desired spectral sensitization spectrum.

It is thus evident that according to the invention, two or more sensitizing dyes may be used in combination so as to provide a desired spectral sensitization spectrum.

A thermographic layer containing a photosensitive silver halide emulsion according to the invention is formed as at least one layer on a support. At least one layer on a support should contain a silver halide and preferably contains an organic silver salt, a developer or reducing agent for silver ion, a binder, and optional agents such as a toner, a coating aid, and other auxiliary agents. Where two layers are provided, a first emulsion layer, which is generally disposed adjacent to the support, contains an organic silver salt and a silver halide and a second emulsion layer or both the layers contain other components. Also contemplated herein is a two layer arrangement consisting of a single photosensitive layer containing all the components and a protective top coat. In the case of multi-color photosensitive photothermographic material, a combination of such two layers may be employed for each color. Also a single layer may contain all necessary components as described in U.S. Pat. No. 4,708,928. In the case of multi-dye, multi-color, photosensitive photothermographic material, photosensitive layers are distinctly supported by providing a functional or non-functional barrier layer therebetween as described in U.S. Pat. No. 4,460,681.

In one preferred embodiment, the photothermographic material of the invention is a single-side photosensitive material having at least one photosensitive (or emulsion) layer containing a silver halide emulsion on one surface and a backing layer on the other surface of the support.

A method for forming a photosensitive silver halide is well known in the art. Any of the methods disclosed in Research Disclosure No. 17029 (June 1978) and U.S. Pat. No. 3,700,458, for example, may be used. Illustrative methods which can be used herein are a method of adding a halogen-containing compound to a pre-formed organic silver salt to convert a part of silver of the organic silver salt into photosensitive silver halide and a method of adding a silver-providing compound and a halogen-providing compound to a solution of gelatin or another polymer to form photosensitive silver halide grains and mixing the grains with an organic silver salt. The latter method is preferred in the practice of the invention.

The photosensitive silver halide should preferably have a smaller grain size for the purpose of minimizing white turbidity after image formation. Specifically, the grain size is less than 0.20 $\mu$m, preferably 0.01 $\mu$m to 0.15 $\mu$m, most preferably 0.02 $\mu$m to 0.12 $\mu$m. The term grain size designates the length of an edge of a silver halide grain where silver halide grains are regular grains of cubic or octahedral shape. Where silver halide grains are tabular, the grain size is the diameter of an equivalent circle having the same area as the projected area of a major surface of a tabular grain. Where silver halide grains are not regular, for example, in the case of spherical or rod-shaped grains, the grain size is the diameter of an equivalent sphere having the same volume as a grain.

The shape of silver halide grains may be cubic, octahedral, tabular, spherical, rod-like and potato-like, with cubic and tabular grains being preferred in the practice of the invention. Where tabular silver halide grains are used, they should preferably have an average aspect ratio of from 100:1 to 2:1, more preferably from 50:1 to 3:1. Silver halide grains having rounded corners are also preferably used. No particular limit is imposed on the face indices (Miller indices) of an outer surface of photosensitive silver halide grains. Preferably silver halide grains have a high proportion of [100] face featuring high spectral sensitization efficiency upon adsorption of a spectral sensitizing dye. The proportion of [100] face is preferably at least 50%, more preferably at least 65%, most preferably at least 80%. Note that the proportion of Miller index [100] face can be determined by the method described in T. Tani, J. Imaging Sci., 29, 165 (1985), utilizing the adsorption dependency of [111] face and [100] face upon adsorption of a sensitizing dye.

The halogen composition of photosensitive silver halide is not critical and may be any of silver chloride, silver chlorobromide, silver bromide, silver iodobromide, silver iodochlorobromide, and silver iodide. Silver bromide or silver iodobromide is preferred in the practice of the invention. Most preferred is silver iodobromide preferably having a silver iodide content of 0.1 to 40 mol %, especially 0.1 to 20 mol %. The halogen composition in grains may have a uniform distribution or a non-uniform distribution wherein the halogen concentration changes in a stepped or continuous manner. Preferred are silver iodobromide grains having a higher silver iodide content in the interior. Silver halide grains of the core/shell structure are also useful. Such core/shell grains preferably have a multilayer structure of 2 to 5 layers, more preferably 2 to 4 layers.

Preferably the photosensitive silver halide grains used herein contain at least one complex of a metal selected from the group consisting of rhodium, rhenium, ruthenium, osmium, iridium, cobalt, and iron. The metal complexes may be used alone or in admixture of two or more complexes of a common metal or different metals. An appropriate content of the metal complex is $1 \times 10^{-9}$ to $1 \times 10^{-3}$ mol, more preferably $1 \times 10^{-8}$ to $1 \times 10^{-4}$ mol per mol of silver. Illustrative metal complex structures are those described in JP-A 225449/1995. Preferred among cobalt and iron complexes are hexacyano metal complexes. Illustrative, non-limiting examples of cobalt and iron complexes include hexacyano metal complexes such as ferricyanate, ferrocyanate, and hexacyanocobaltate ions. The distribution of the metal complex in silver halide grains is not critical. That is, the metal complex may be contained in silver halide grains to form a uniform phase or at a high concentration in either the core or the shell.

Photosensitive silver halide grains may be desalted by any of well-known water washing methods such as noodle and flocculation methods although silver halide grains may be either desalted or not according to the invention.

The photosensitive silver halide grains used herein should preferably be chemically sensitized. Preferred chemical sensitization methods are sulfur, selenium, and tellurium sensitization methods which are well known in the art. Also useful are a noble metal sensitization method using compounds of gold, platinum, palladium, and iridium and a reduction sensitization method. In the sulfur, selenium, and tellurium sensitization methods, any of compounds well known for the purpose may be used. For example, the compounds described in JP-A 128768/1995 are useful. Exemplary tellurium sensitizing agents include diacyltellurides, bis(oxycarbonyl)tellurides, bis(carbamoyl) tellurides, bis(oxycarbonyl)ditellurides, bis(carbamoyl) ditellurides, compounds having a P=Te bond, tellurocarboxylic salts, Te-organyltellurocarboxylic esters, di(poly) tellurides, tellurides, telluroles, telluroacetals, tellurosulfonates, compounds having a P—Te bond, Te-containing heterocycles, tellurocarbonyl compounds, inorganic tellurium compounds, and colloidal tellurium. The preferred compounds used in the noble metal sensitization method include chloroauric acid, potassium chloroaurate, potassium aurithiocyanate, gold sulfide, and gold selenide as well as the compounds described in U.S. Pat. No. 2,448,060 and UKP 618,061. Illustrative examples of the compound used in the reduction sensitization method include ascorbic acid, thiourea dioxide, stannous chloride, aminoiminomethane-sulfinic acid, hydrazine derivatives, boran compounds, silane compounds, and polyamine compounds. Reduction sensitization may also be accomplished by ripening the emulsion while maintaining it at pH 7 or higher or at pAg 8.3 or lower. Reduction sensitization may also be accomplished by introducing a single addition portion of silver ion during grain formation.

According to the invention, the photosensitive silver halide is preferably used in an amount of 0.01 to 0.5 mol, more preferably 0.02 to 0.3 mol, most preferably 0.03 to 0.25 mol per mol of the organic silver salt. With respect to a method and conditions of admixing the separately prepared photosensitive silver halide and organic silver salt, there may be used a method of admixing the separately prepared photosensitive silver halide and organic silver salt in a high speed agitator, ball mill, sand mill, colloidal mill, vibratory mill or homogenizer or a method of preparing an organic silver salt by adding a preformed photosensitive silver halide at any timing during preparation of an organic silver salt. Any desired mixing method may be used insofar as the benefits of the invention are fully achievable.

The organic silver salt used herein is a silver salt which is relatively stable to light, but forms a silver image when heated at 80° C. or higher in the presence of an exposed photocatalyst (as typified by a latent image of photosensitive silver halide) and a reducing agent. The organic silver salt may be of any desired organic compound containing a source capable of reducing silver ion. Preferred are silver salts of organic acids, typically long chain aliphatic carboxylic acids having 10 to 30 carbon atoms, especially 15 to 28 carbon atoms. Also preferred are complexes of organic or inorganic silver salts with ligands having a stability constant in the range of 4.0 to 10.0. x silver-providing substance is preferably used in an amount of about 5 to 30% by weight of an image forming layer. Preferred organic acid silver salts include silver salts of organic compounds having a carboxyl group. Examples include silver salts of aliphatic carboxylic acids and silver salts of aromatic carboxylic acids though not limited thereto. Preferred examples of the silver salt of aliphatic carboxylic acid include silver behenate, silver stearate, silver oleate, silver laurate, silver caproate, silver myristate, silver palmitate, silver maleate, silver fumarate, silver tartrate, silver linolate, silver butyrate, silver camphorate and mixtures thereof.

In the practice of the invention, silver salts of compounds having a mercapto or thion group and derivatives thereof may also be used. Preferred examples of these compounds include a silver salt of 3-mercapto-4-phenyl-1,2,4-triazole, a silver salt of 2-mercaptobenzimidazole, a silver salt of 2-mercapto-5-aminothiadiazole, a silver salt of 2-(ethylglycolamido)benzothiazole, silver salts of thioglycolic acids such as silver salts of S-alkylthioglycolic acids wherein the alkyl group has 12 to 22 carbon atoms, silver salts of dithiocarboxylic acids such as a silver salt of dithioacetic acid, silver salts of thioamides, a silver salt of 5-carboxyl-1-methyl-2-phenyl-4-thiopyridine, silver salts of mercaptotriazines, a silver salt of 2-mercaptobenzoxazole as well as silver salts of 1,2,4-mercaptothiazole derivatives such as a silver salt of 3-amino-5-benzylthio-1,2,4-thiazole as described in U.S. Pat. No. 4,123,274 and silver salts of thion compounds such as a silver salt of 3-(3-carboxyethyl)-4-methyl-4-thiazoline-2-thion as described in U.S. Pat. No. 3,301,678. Compounds containing an imino group may also be used. Preferred examples of these compounds include silver salts of benzotriazole and derivatives thereof, for example, silver salts of benzotriazoles such as silver methylbenzotriazole, silver salts of halogenated benzotriazoles such as silver 5-chlorobenzotriazole as well as silver salts of 1,2,4-triazole and 1-H-tetrazole and silver salts of imidazole and imidazole derivatives as described in U.S. Pat. No. 4,220,709. Also useful are various silver acetylide compounds as described, for example, in U.S. Pat. Nos. 4,761,361 and 4,775,613.

The organic silver salt which can be used herein may take any desired shape although needle crystals having a minor axis and a major axis are preferred. The inverse proportional relationship between the size of silver salt crystal grains and their covering power that is well known for photosensitive silver halide materials also applies to the photothermographic material of the present invention. That is, as organic silver salt grains constituting image forming regions of photothermographic material increase in size, the covering power becomes smaller and the image density becomes lower. It is thus necessary to reduce the grain size. In the practice of the invention, grains should preferably have a minor axis of 0.01 $\mu$m to 0.20 $\mu$m, more preferably 0.01 $\mu$m to 0.15 $\mu$m and a major axis of 0.10 $\mu$m to 5.0 $\mu$m, more preferably 0.10 $\mu$m to 4.0 $\mu$m. The grain size distribution is desirably monodisperse. The monodisperse distribution means that a standard deviation of the length of minor and major axes divided by the length, respectively, expressed in percent, is preferably up to 100%, more preferably up to 80%, most preferably up to 50%. It can be determined from the measurement of the shape of organic silver salt grains using an image obtained through a transmission electron microscope. Another method for determining a monodisperse distribution is to determine a standard deviation of a volume weighed mean diameter. The standard deviation divided by the volume weighed mean diameter, expressed in percent, which is a coefficient of variation, is preferably up to 100%, more preferably up to 80%, most preferably up to 50%. It may be determined by irradiating laser light, for example, to organic silver salt grains dispersed in liquid and determining the auto-correlation function of the fluctuation of scattering light relative to a time change, and obtaining the grain size (volume weighed mean diameter) therefrom.

The organic silver salt is used in any desired amount, preferably in such an amount as to provide a coverage of 0.1 to 5 grams, especially 1 to 3 grams per square meter of the photosensitive material.

The reducing agent for the organic silver salt may be any of substances, preferably organic substances, that reduce silver ion into metallic silver. Conventional photographic developing agents such as Phenidone®, hydroquinone and catechol are useful although hindered phenols are preferred reducing agents. The reducing agent should preferably be contained in an amount of 1 to 10% by weight of an image forming layer. In a multilayer embodiment wherein the reducing agent is added to a layer other than an emulsion layer, the reducing agent should preferably be contained in a slightly higher amount of about 2 to 15% by weight of that layer.

For photothermographic materials using organic silver salts, a wide range of reducing agents are disclosed. Exemplary reducing agents include amidoximes such as phenylamidoxime, 2-thienylamidoxime, and p-phenoxyphenylamidoxime; azines such as 4-hydroxy-3,5-dimethoxy-benzaldehydeazine; combinations of aliphatic carboxylic acid arylhydrazides with ascorbic acid such as a combination of 2,2-bis(hydroxymethyl)propionyl-β-phenylhydrazine with ascorbic acid; combinations of polyhydroxybenzenes with hydroxylamine, reductone and/or hydrazine, such as combinations of hydroquinone with bis(ethoxyethyl)hydroxylamine, piperidinohexosereductone or formyl-4-methylphenylhydrazine; hydroxamic acids such as phenylhydroxamic acid, p-hydroxyphenylhydroxamic acid, and β-anilinehydroxamic acid; combinations of azines with sulfonamidophenols such as a combination of phenothiazine with 2,6-dichloro-4-benzenesulfonamidephenol; α-cyanophenyl acetic acid derivatives such as ethyl-α-cyano-2-methylphenyl acetate and ethyl-α-cyanophenyl acetate; bis-β-naphthols such as 2,2-dihydroxy-1,1-binaphthyl, 6,6-dibromo-2,2-dihydroxy-1,l-binaphthyl, and bis(2-hydroxy-1-naphthyl)methane; combinations of bis-β-naphthols with 1,3-dihydroxybenzene derivatives such as 2,4-dihydroxybenzophenone and 2,4-dihydroxyacetophenone; 5-pyrazolones such as 3-methyl-1-phenyl-5-pyrazolone; reductones such as dimethylaminohexosereductone, anhydrodihydroaminohexosereductone and anhydrodihydropiperidonehexosereductone; sulfonamidephenol reducing agents such as 2,6-dichloro-4-benzenesulfonamidephenol and p-benzenesulfonamidephenol; 2-phenylindane-1,3-dione, etc.; chromans such as 2,2-dimethyl-7-t-butyl-6-hydroxychroman; 1,4-dihydropyridines such as 2,6-dimethoxy-3,5-dicarbo-ethoxy-1,4-dihydropyridine; bisphenols such as bis(2-hydroxy-3-t-butyl-5-methylphenyl)methane, 2,2-bis(4-hydroxy-3-methylphenyl) propane, 4,4-ethylidene-bis(2-t-butyl-6-methylphenol), 1,1-bis(2-hydroxy-3,5-dimethylphenyl)-3,5,5-trimethylhexane, and 2,2-bis(3,5-dimethyl-4-hydroxyphenyl)-propane; ascorbic acid derivatives such as 1-ascorbyl palmitate and ascorbyl stearate; aldehydes and ketones such as benzil and diacetyl; 3-pyrazolidones and certain indane-1,3-diones; and chromanols (tocopherols). Preferred reducing agents are bisphenols and chromanols.

It is sometimes advantageous to use an additive known as a "toner" for improving images in addition to the above-mentioned components. The toner is used in an amount of 0.1 to 10% by weight of the entire silver-carrying components. The toners are compounds well known in the photographic art as shown in U.S. Pat. Nos. 3,080,254, 3,847,612 and 4,123,282.

Examples of the toner include phthalimide and N-hydroxyphthalimide; cyclic imides such as succinimide, pyrazoline-5-ones, quinazoline, 3-phenyl-2-pyrazolin-5-one, 1-phenylurazol, quinazoline and 2,4-thiazolizinedione; naphthalimides such as N-hydroxy-1,8-naphthalimide; cobalt complexes such as cobaltic hexamine trifluoroacetate; mercaptans as exemplified by 3-mercapto-1,2,4-triazole, 2,4-dimercaptopyrimidine, 3-mercapto-4,5-diphenyl-1,2,4-triazole, and 2,5-dimercapto-1,3,4-thiadiazole; N-(aminomethyl)aryldicarboxyimides such as (N,N-dimethylaminomethyl)phthalimide and N,N-(dimethylaminomethyl)-naphthalene-2,3-dicarboxyimide; blocked pyrazoles, isothiuronium derivatives and certain photo-bleach agents such as N,N'-hexamethylenebis(1-carbamoyl-3,5-dimethyl-pyrazole), 1,8-(3,6-diazaoctane)bis (isothiuroniumtrifluoroacetate) and 2-tribromomethylsulfonyl-benzothiazole; 3-ethyl-5-{(3-ethyl-2-benzothiazolinylidene)-1-methyl-ethylidene}-2-thio-2,4-oxazolidinedione; phthalazinone, phthalazinone derivatives or metal salts, or derivatives such as 4-(1-naphthyl)phthalazinone, 6-chlorophthalazinone, 5,7-dimethoxyphthalazinone and 2,3-dihydro-1,4-phthalazinedione; combinations of phthalazinone with phthalic acid derivatives (e.g., phthalic acid, 4-methylphthalic acid, 4-nitrophthalic acid, and tetrachlorophthalic anhydride); phthalazine, phthalazine derivatives or metal salts, or derivatives such as 4-(1-naphthyl)phthlazine, 6-chlorophthalazine, 5,7-dimethoxyphthalazine and 2,3-dihydrophthlazine; combinations of phthalazine with phthalic acid derivatives (e.g., phthalic acid, 4-methylphthalic acid, 4-nitrophthalic acid, and tetrachlorophthalic anhydride); quinazolinedione, benzoxazine or naphthoxazine derivatives; rhodium complexes which function not only as a tone regulating agent, but also as a source of halide ion for generating silver halide in situ, for example, ammonium hexachlororhodinate (III), rhodium bromide, rhodium nitrate and potassium hexachlororhodinate (III); inorganic peroxides and persulfates such as ammonium peroxide disulfide and hydrogen peroxide; benzoxazine-2,4-diones such as 1,3-benzoxazine-2,4-dione, 8-methyl-1,3-benzoxazine-2,4-dione, and 6-nitro-1,3-benzoxazine-2,4-dione; pyrimidine and asym-triazines such as 2,4-dihydroxypyrimidine and 2-hydroxy-4-aminopyrimidine; azauracil and tetraazapentalene derivatives such as 3,6-dimercapto-1,4-diphenyl-1H, 4H-2,3a,5,6a-tetraazapentalene, and 1,4-di(o-chlorophenyl)-3,6-dimercapto-1H,4H-2,3a,5,6a-tetraazapentalene.

In the thermographic material of the invention, mercapto, disulfide and thion compounds may be added for the purposes of retarding or accelerating development to control development, improving spectral sensitization efficiency, and improving storage stability before and after development.

Where mercapto compounds are used herein, any structure is acceptable. Preferred are structures represented by Ar—SM and Ar—S—S—Ar wherein M is a hydrogen atom or alkali metal atom, and Ar is an aromatic ring or fused aromatic ring having at least one nitrogen, sulfur, oxygen, selenium or tellurium atom. Preferred hetero-aromatic rings are benzimidazole, naphthimidazole, benzothiazole, naphtho-thiazole, benzoxazole, naphthoxazole, benzoselenazole, benzotellurazole, imidazole, oxazole, pyrrazole, triazole, thiadiazole, tetrazole, triazine, pyrimidine, pyridazine, pyrazine, pyridine, purine, quinoline and quinazolinone rings. These hetero-aromatic rings may have a substituent selected from the group consisting of halogen (e.g., Br and Cl), hydroxy, amino, carboxy, alkyl groups (having at least 1 carbon atom, preferably 1 to 4 carbon atoms), and alkoxy groups (having at least 1 carbon atom, preferably 1 to 4 carbon atoms). Illustrative, non-limiting examples of the mercapto-substituted hetero-aromatic compound include 2-mercaptobenzimidazole, 2-mercaptobenzoxazole, 2-mercaptobenzothiazole, 2-mercapto-5-methylbenzimidazole, 6-ethoxy-2-mercaptobenzothiazole, 2,2'-dithiobis(benzothiazole), 3-mercapto-1,2,4-triazole, 4,5-diphenyl-2-imidazolethiol, 2-mercaptoimidazole, 1-ethyl-2-mercaptobenzimidazole, 2-mercaptoquinoline, 8-mercaptopurine, 2-mercapto-4(3H)-quinazolinone, 7-trifluoromethyl-4-quinolinethiol, 2,3,5,6-tetrachloro-4-pyridinethiol, 4-amino-6-hydroxy-2-mercaptopyrimidine monohydrate, 2-amino-5-mercapto-1,3,4-thiadiazole, 3-amino-5-mercapto-1,2,4-triazole, 4-hydroxy-2-mercaptopyrimidine, 2-mercaptopyrimidine, 4,6-diamino-2-mercaptopyrimidine, 2-mercapto-4-methylpyrimidine hydrochloride, 3-mercapto-5-phenyl-1,2,4-triazole, and 2-mercapto-4-phenyloxazole.

These mercapto compounds are preferably added to the emulsion layer in amounts of 0.001 to 1.0 mol, more preferably 0.01 to 0.3 mol per mol of silver.

A surface protective layer may be provided in the photosensitive material according to the present invention for the purpose of preventing adhesion of an image forming layer. The surface protective layer may be formed of any adhesion-preventing material. Examples of the adhesion-preventing material include wax, silica particles, styrene-containing elastomeric block copolymers (e.g., styrene-butadiene-styrene and styrene-isoprene-styrene), cellulose acetate, cellulose acetate butyrate, cellulose propionate and mixtures thereof.

In the emulsion layer or a protective layer therefor according to the invention, there may be used light absorbing substances and filter dyes as described in U.S. Pat. Nos. 3,253,921, 2,274,782, 2,527,583, and 2,956,879. The dyestuffs may be mordanted as described in U.S. Pat. No. 3,282,699. The filter dye is preferably used in such an amount as to provide an absorbance of 0.1 to 3, especially 0.2 to 1.5 at the exposure wavelength.

In the emulsion layer or a protective layer therefor according to the invention, there may be contained matte agents, for example, starch, titanium dioxide, zinc oxide, silica, and polymer beams including beads of the type described in U.S. Pat. Nos. 2,992,101 and 2,701,245. The emulsion surface may have any degree of matte insofar as no star dust failures occur although a Bekk smoothness of 100 to 10,000 seconds, especially 1,000 to 10,000 seconds is preferred.

The emulsion layer is based on a binder. Exemplary binders are naturally occurring polymers and synthetic resins, for example, gelatin, polyvinyl acetal, polyvinyl chloride, polyvinyl acetate, cellulose acetate, polyolefins, polyesters, polystyrene, polyacrylonitrile, and polycarbonate. Of course, copolymers and terpolymers are included. Preferred polymers are polyvinyl butyral, butylethyl cellulose, methacrylate copolymers, maleic anhydride ester copolymers, polystyrene and butadiene-styrene copolymers. These polymers may be used alone or in admixture of two or more as desired. The polymer is used in such a range that it may effectively function as a binder to carry various components. The effective range may be properly determined by those skilled in the art without undue experimentation. Taken at least as a measure for carrying the organic silver salt in the film, the weight ratio of the binder to the organic silver salt is preferably in the range of from 15:1 to 1:2, more preferably from 8:1 to 1:1.

In one preferred embodiment, the photothermographic material of the invention is a single-side photosensitive material having at least one photosensitive (or emulsion) layer containing a silver halide emulsion on one surface and a backing layer on the other surface of the support.

To the single-side photosensitive material of the invention, a matte agent may be added for the purpose of improving the feed thereof. The matte agents used herein are generally microparticulate water-insoluble organic or inorganic compounds. There may be used any desired one of matte agents, for example, well-known matte agents including organic matte agents as described in U.S. Pat. Nos. 1,939,213, 2,701,245, 2,322,037, 3,262,782, 3,539,344, and 3,767,448 and inorganic matte agents as described in U.S. Pat. Nos. 1,260,772, 2,192,241, 3,257,206, 3,370,951, 3,523,022, and 3,769,020. Illustrative examples of the organic compound which can be used as the matte agent are given below; exemplary water-dispersible vinyl polymers include polymethyl acrylate, polymethyl methacrylate, polyacrylonitrile, acrylonitrile-α-methylstyrene copolymers, polystyrene, styrene-divinyl-benzene copolymers, polyvinyl acetate, polyethylene carbonate, and polytetrafluoroethylene; exemplary cellulose derivatives include methyl cellulose, cellulose acetate, and cellulose acetate propionate; exemplary starch derivatives include carboxystarch, carboxynitrophenyl starch, urea-formaldehyde-starch reaction products, gelatin hardened with well-known curing agents, and hardened gelatin which has been coaceruvation hardened into microcapsulated hollow particles. Preferred examples of the inorganic compound which can be used as the matte agent include silicon dioxide, titanium dioxide, magnesium dioxide, aluminum oxide, barium sulfate, calcium carbonate, silver chloride and silver bromide desensitized by a well-known method, glass, and diatomaceous earth. The aforementioned matte agents may be used as a mixture of substances of different types if necessary.

No particular limit is imposed on the size and shape of the matte agent. The matte agent used herein may have any desired shape, for example, spherical and irregular shapes. The matte agent of any particle size may be used although matte agents having a particle size of about 0.1 $\mu$m to 30 $\mu$m, especially about 0.3 to 15 $\mu$m are preferably used in the practice of the invention. The particle size distribution of the matte agent may be either narrow (so-called monodisperse) or wide. Nevertheless, since the haze and surface luster of photosensitive material are largely affected by the matte agent, it is preferred to adjust the particle size, shape and particle size distribution of a matte agent as desired during preparation of the matte agent or by mixing plural matte agents.

The backing layer should preferably have a degree of matte as expressed by a Bekk smoothness of 10 to 250 seconds, more preferably 50 to 180 seconds.

In the photothermographic material of the invention, the matte agent may be added to any desired layer. Preferably the matte agent is added to an outermost surface layer, a layer functioning as an outermost surface layer or a layer close to the outer surface, namely a layer functioning as a so-called protective layer.

In the practice of the invention, the binder used in the backing layer is preferably transparent or translucent and generally colorless. Exemplary binders are naturally occurring polymers, synthetic resins, polymers and copolymers, and other film-forming media, for example, gelatin, gum arabic, poly(vinyl alcohol), hydroxyethyl cellulose, cellulose acetate, cellulose acetate butyrate, poly(vinyl pyrrolidone), casein, starch, poly(acrylic acid), poly(methyl methacrylate), polyvinyl chloride, poly(methacrylic acid), copoly(styrene-maleic anhydride), copoly(styrene-acrylonitrile), copoly(styrene-butadiene), polyvinyl acetals (e.g., polyvinyl formal and polyvinyl butyral), polyesters, polyurethanes, phenoxy resins, poly(vinylidene chloride), polyepoxides, polycarbonates, poly(vinyl acetate), cellulose esters, and polyamides. The binder may be dispersed in water or organic solvent to form a dispersion or emulsion which is coated to form a layer.

The backing layer preferably exhibits a maximum absorbance of 0.3 to 2, more preferably 0.5 to 2 in the exposure wavelength range, and an absorbance of 0.001 to less than 0.5 in the visible range after development. Further preferably, the backing layer is an anti-halation layer having an optical density of 0.001 to less than 0.3.

Where anti-halation dyestuffs are used in the practice of the invention, such a dyestuff may be any compound which has desired absorption in the exposure wavelength range, exhibits sufficiently low absorption in the visible region after development, and provides the backing layer with a preferred absorbance spectrum profile. Exemplary antihalation dyes are the compounds described in JP-A 13295/1995, U.S. Pat. No. 5,380,635, JP-A 68539/1990, page 13, lower-left column to page 14, lower-left column, and JP-A 24539/1991, page 14, lower-left column to page 16, lower-right column though not limited thereto.

A backside resistive heating layer as described in U.S. Pat. Nos. 4,460,681 and 4,374,921 may be used in a thermographic imaging system according to the present invention.

With antifoggants, stabilizers and stabilizer precursors, the silver halide emulsion and/or organic silver salt according to the invention can be further protected against formation of additional fog and stabilized against lowering of sensitivity during shelf storage. Suitable antifoggants, stabilizers and stabilizer precursors which can be used alone or in combination include thiazonium salts as described in U.S. Pat. Nos. 2,131,038 and 2,694,716, azaindenes as described in U.S. Pat. Nos. 2,886,437 and 2,444,605, mercury salts as described in U.S. Pat. No. 2,728,663, urazoles as described in U.S. Pat. No. 3,287,135, sulfocatechols as described in U.S. Pat. No. 3,235,652, oximes, nitrons and nitroindazoles as described in UKP 623,448, polyvalent metal salts as described in U.S. Pat. No. 2,839,405, thiuronium salts as described in U.S. Pat. No. 3,220,839, palladium, platinum and gold salts as described in U.S. Pat. Nos. 2,566,263 and 2,597,915, halogen-substituted organic compounds as described in U.S. Pat. Nos. 4,108,665 and 4,442,202, triazines as described in U.S. Pat. Nos. 4,128,557, 4,137,079, 4,138,365 and 4,459,350, and phosphorus compounds as described in U.S. Pat. No. 4,411,985.

In the photosensitive layer, polyhydric alcohols (e.g., glycerin and diols as described in U.S. Pat. No. 2,960,404), fatty acids and esters thereof as described in U.S. Pat. Nos. 2,588,765 and 3,121,060, and silicone resins as described in UKP 955,061 may be added as a plasticizer and lubricant.

According to the invention, a hardener may be used in various layers including a photosensitive emulsion layer, protective layer, and back layer. Examples of the hardener include polyisocyanates as described in U.S. Pat. No. 4,281,060 and JP-A 208193/1994, epoxy compounds as described in U.S. Pat. No. 4,791,042, and vinyl sulfones as described in JP-A 89048/1987.

In the practice of the invention, a surfactant may be used for the purposes of improving coating and electric charging properties. The surfactants used herein may be nonionic, anionic or cationic and fluorinated ones. Examples include fluorinated polymer surfactants as described in JP-A 170950/1987 and U.S. Pat. No. 5,382,504, fluorinated surfactants as described in JP-A 244945/1985 and 188135/1988, polysiloxane surfactants as described in U.S. Pat. No. 3,885,965, and polyalkylene oxide and anionic surfactants as described in JP-A 301140/1994.

Hydrazine derivatives may be used in the present invention. Typical hydrazine derivatives used herein are compounds of the general formula (I) described in Japanese Patent Application No. 47961/1994, specifically compounds I-1 to I-53 described therein.

Other hydrazine derivatives are also preferred. Exemplary hydrazine derivatives include the compounds of the chemical formula [1] in JP-B 77138/1994, more specifically the compounds described on pages 3 and 4 of the same; the compounds of the general formula (I) in JP-B 93082/1994, more specifically compound Nos. 1 to 38 described on pages 8 to 18 of the same; the compounds of the general formulae (4), (5) and (6) in JP-A 230497/1994, more specifically compounds 4-1 to 4-10 described on pages 25 and 26, compounds 5-1 to 5-42 described on pages 28 to 36, and compounds 6-1 to 6-7 described on pages 39 and 40 of the same; and the compounds of the general formulae (1) and (2) in JP-A 289520/1994, more specifically compounds 1-1 to 1-17 and 2-1 described on pages 5 to 7 of the same; the compounds of the chemical formulae [2] and [3] in JP-A 313936/1994, more specifically the compounds described on pages 6 to 19 of the same; the compounds of the chemical formula [1] in JP-A 313951/1994, more specifically the compounds described on pages 3 to 5 of the same; the compounds of the general formula (I) in JP-A 5610/1995, more specifically compounds I-1 to I-38 described on pages 5 to 10 of the same; the compounds of the general formula (II) in JP-A 77783/1995, more specifically compounds II-1 to II-102 described on pages 10 to 27 of the same; the compounds of the general formulae (H) and (Ha) in JP-A 104426/199S, more specifically compounds H-1 to H-44 described on pages 8 to 15 of the same; the compounds having an anionic group in proximity to a hydrazine group or a nonionic group forming an intramolecular hydrogen bond with the hydrogen atom of hydrazine described in Japanese Patent Application No. 191007/1995, specifically the compounds of the general formulae (A), (B), (C), (D), (E), and (F), more specifically compounds N-1 to N-30 described therein; and the compounds of the general formula (1) in Japanese Patent Application No. 191007/1995, more specifically compounds D-1 to D-55 described therein.

Hydrazine nucleating agents are used by dissolving in suitable water-miscible organic solvents such as alcohols (e.g., methanol, ethanol, propanol, and fluorinated alcohols), ketones (e.g., acetone and methyl ethyl ketone), dimethylformamide, dimethylsulfoxide, and methyl cellosolve.

A well-known emulsifying dispersion method is used for dissolving the hydrazine derivative with the aid of an oil such as dibutyl phthalate, tricresyl phosphate, glyceryl triacetate and diethyl phthalate or an auxiliary solvent such as ethyl acetate and cyclohexanone whereby an emulsified dispersion is mechanically prepared. Alternatively, a method known as a solid dispersion method is used for dispersing the hydrazine derivative in powder form in water in a ball mill, colloidal mill or ultrasonic mixer.

The hydrazine nucleating agent may be added to any layer on a support on the same side as a silver halide emulsion layer (or photosensitive layer), that is, a silver halide emulsion layer on a support or any hydrophilic colloid layer on the same side, preferably to the silver halide emulsion layer or a hydrophilic colloid layer disposed adjacent thereto.

An appropriate amount of hydrazine nucleating agent is 1 $\mu$mol to 10 mmol, more preferably 10 $\mu$mol to 5 mmol, most preferably 20 $\mu$mol to 5 mmol per mol of silver halide.

Though not essential, it is sometimes advantageous to add a mercury (II) salt to the emulsion layer as an antifoggant. The mercury (II) salts preferred to this end are mercury acetate and mercury bromide.

According to the invention, the photothermographic emulsion may be coated on a variety of supports. Typical supports include polyester film, subbed polyester film, poly(ethylene terephthalate) film, polyethylene naphthalate film, cellulose nitrate film, cellulose ester film, poly(vinyl acetal) film, polycarbonate film and related or resinous materials, as well as glass, paper, metals, etc. Often used are flexible substrates, typically paper supports, specifically baryta paper and paper supports coated with partially acetylated α-olefin polymers, especially polymers of α-olefins having 2 to 10 carbon atoms such as polyethylene, polypropylene, and ethylene-butene copolymers. The supports are either transparent or opaque, preferably transparent.

The photosensitive material of the invention may have an antistatic or electroconductive layer, for example, a layer containing soluble salts (e.g., chlorides and nitrates), an evaporated metal layer, or a layer containing ionic polymers as described in U.S. Pat. Nos. 2,861,056 and 3,206,312 or insoluble inorganic salts as described in U.S. Pat. No. 3,428,451.

A method for producing color images using the photothermographic material of the invention is as described in JP-A 13295/1995, page 10, left column, line 43 to page 11, left column, line 40. Stabilizers for color dye images are exemplified in UKP 1,326,889, U.S. Pat. Nos. 3,432,300, 3,698,909, 3,574,627, 3,573,050, 3,764,337, and 4,042,394.

In the practice of the invention, the photothermographic emulsion can be coated by various coating procedures including dip coating, air knife coating, flow coating, and extrusion coating using a hopper of the type described in U.S. Pat. No. 2,681,294. If desired, two or more layers may be concurrently coated by the methods described in U.S. Pat. No. 2,761,791 and UKP 837,095.

In the photothermographic material of the invention, there may be contained additional layers, for example, a dye accepting layer for accepting a mobile dye image, an opacifying layer when reflection printing is desired, a protective topcoat layer, and a primer layer well known in the photothermographic art. The photosensitive material of the invention is preferably such that only a single sheet of the photosensitive material can form an image. That is, it is preferred that a functional layer necessary to form an image such as an image receiving layer does not constitute a separate member.

The photosensitive material of the invention may be developed by any desired method although it is generally developed by heating after imagewise exposure. The preferred developing temperature is about 80 to 250° C., more preferably 100 to 140° C. and the preferred developing time is about 1 to 180 seconds, more preferably about 10 to 90 seconds.

Any desired technique may be used for the exposure of the photothermographic material of the invention. The preferred light source for exposure is a laser, for example, a gas laser, YAG laser, dye laser, and semiconductor laser. A semiconductor laser combined with a second harmonic generating device is also useful.

EXAMPLE

Examples of the present invention are given below by way of illustration and not by way of limitation.

The trade names used in Examples have the following meaning.

Denka Butyral: polyvinyl butyral by Denki Kagaku Kogyo K.K.
BUTVAR: polyvinyl butyral by Monsanto Co.
Megafax F-176P: fluorinated surfactant by Dai-Nihon Ink Chemical Industry K.K.
CAB 171-15S: cellulose acetate butyrate by Eastman Chemical Products, Inc.
Sildex H31: spherical silica by Dokai Chemical K.K.
Sumidur N3500: polyisocyanate by Sumitomo-Bayern Urethane K.K.

Example 1

Preparation of silver halide grains

In 700 ml of water were dissolved 22 grams of phthalated gelatin and 30 mg of potassium bromide. The solution was adjusted to pH 5.0 at a temperature of 35° C. To the solution, 159 ml of an aqueous solution containing 18.6 grams of silver nitrate and an aqueous solution containing potassium bromide and potassium iodide in a molar ratio of 92:8 were added over 10 minutes by the controlled double jet method while maintaining the solution at pAg 7.7. Then, 476 ml of an aqueous solution containing 55.4 grams of silver nitrate and an aqueous solution containing 9 $\mu$mol/liter of dipotassium hexachloroiridate and 1 mol/liter of potassium bromide were added over 30 minutes by the controlled double jet method while maintaining the solution at pAg 7.7. The pH of the solution was lowered to cause flocculation and sedimentation for desalting. The solution was adjusted to pH 5.9 and pAg 8.2 by adding 0.1 gram of phenoxyethanol. There were obtained silver iodobromide grains in the form of cubic grains having an iodine content of 8 mol % in the core and 2 mol % on the average, a mean grain size of 0.05 $\mu$m, a coefficient of variation of projected area of 8%, and a [100] face proportion of 87%.

The thus obtained silver halide grains were heated at 60° C., to which 85 $\mu$mol of sodium thiosulfate, 11 $\mu$mol of 2,3,4,5,6-pentafluorophenyldiphenylphosphine selenide, 15 $\mu$mol of tellurium compound 1, 2 $\mu$mol of chloroauric acid, and 200 $\mu$mol of thiocyanic acid were added per mol of silver. The solution was ripened for 150 minutes and quenched to 30° C., obtaining a silver halide emulsion.

Preparation of organic acid silver emulsion

A mixture of 1.3 grams of stearic acid, 0.5 gram of arachidic acid, 8.5 grams of behenic acid, 0.05 gram of oleic acid, and 300 ml of distilled water was stirred at 90° C. for 15 minutes. With vigorous stirring, 31.1 ml of 1N NaOH aqueous solution was added over 15 minutes to the solution, which was cooled to 30° C. 7 ml of 1N phosphoric acid aqueous solution was added to the solution. With more vigorous stirring, 9 mg of N-bromosuccinimide was added to the solution and the above-prepared silver halide emulsion was added in such an amount as to give 2.5 mmol of silver halide. Further, 25 ml of 1N silver nitrate aqueous solution was added over 2 minutes and stirring was continued for 90 minutes. The solids were separated by suction filtration and washed with water until the water filtrate reached a conductivity of 30 $\mu$S/cm. To the thus obtained solids was added 37 grams of a 1.2 wt % butyl acetate solution of polyvinyl acetate, followed by agitation. Agitation was stopped and the reaction mixture was allowed to stand whereupon it separated into an oil layer and an aqueous layer. The aqueous layer was removed together with salts contained therein. To the oil layer was added 20 grams of a 2.5 wt % 2-butanone solution of polyvinyl butyral (Denka Butyral #3000-K), followed by agitation. Then 0.1 mmol of pyridinium bromide perbromide and 0.1 mmol of calcium bromide dihydrate were added thereto together with 0.5 gram of methanol, and 40 grams of 2-butanone and 7.8 grams of polyvinyl butyral (BUTVAR® B-76) were further added. The mixture was dispersed by means of a homogenizer, obtaining an organic acid silver salt emulsion of needle grains having a mean minor diameter of 0.04 $\mu$m, mean major diameter of 1 $\mu$m and a coefficient of variation of 29%.

Preparation of emulsion layer coating solution

An emulsion layer coating solution A was prepared by adding various chemicals to the above-prepared organic acid silver salt emulsion in amounts per mol of silver. With stirring at 25° C., 10 mg of sodium phenylthiosulfonate, 70 mg of dye D-1, 2 grams of 2-mercapto-5-methylbenzoimidazole, 21.5 grams of 4-chlorobenzophenone-2-carboxylic acid, 580 grams of 2-butanone, and 220 grams of dimethylformamide were added to the emulsion, which was allowed to stand for 3 hours. With stirring, there were further added 8 grams of 5-tribromomethylsulfonyl-2-methylthiadiazole, 6 grams of 2-tribromomethylsulfonylbenzothiazole, 5 grams of 4,6-ditrichloromethyl-2-phenyltriazine, 2 grams of disulfide compound 1, 135 grams of 1,1-bis(2-hydroxy-3,5-dimethylphenyl)-3,5,5-trimethylhexane, 5 grams of tetrachlorophthalic acid, 1.1 grams of Megafax F-176P, 590 grams of 2-butanone, and 10 grams of methyl isobutyl ketone.

Emulsion layer coating solutions B to E were similarly prepared except that dye D-1 was replaced by an equimolar amount of dye D-2, dye D-3, comparative dye 1, and comparative dye 2.

Emulsion surface protective layer coating solution

A coating solution was prepared by dissolving 75 grams of CAB 171-15S, 5.7 grams of 4-methylphthalic acid, 1.5 grams of tetrachlorophthalic anhydride, 12 grams of phthalazine, 0.3 gram of Megafax F-176P, 2 grams of Sildex H31 (spherical silica having a mean particle size of 3 μm), and 6 grams of Sumidur N3500 in 3,070 grams of 2-butanone and 30 grams of ethyl acetate.

Preparation of coating solution I-A

A coating solution I-A was obtained by separately dispersing tricyclohexylguanidine which is a solid base with other ingredients according to the following formulation in a sand mill (1/16 G sand grinder mill by Imex K.K.).

| Solid base | 12.0 g |
| Polyvinyl alcohol | 1.56 g |
| H$_2$O | 26.4 g |

Preparation of coating solution I-B

A chromophoric system of a basic colorless dye precursor and an acidic material was prepared as follows. An organic solvent phase was prepared by mixing and dissolving the following components.

| Basic dye precursor (I-L) | 2 g |
| Acidic material (I-K) | 2 g |
| 3:1 addition product of xylylene diisocyanate and trimethylol propane | 18 g |
| Dibutyl phthalate | 24 g |
| Ethyl acetate | 5 g |

An aqueous solution phase was prepared by mixing and dissolving the following components.

| Polyvinyl alcohol | 5.2 g |
| H$_2$O | 58 g |

The organic solvent phase was mixed with the aqueous solution phase. The mixture was emulsified and dispersed at room temperature, obtaining an emulsion having a mean particle size of 2.5 μm. The emulsion was combined with 100 grams of water, heated to 60° C., and stirred at the temperature for 2 hours, obtaining a solution of microcapsules containing the basic colorless dye precursor and acidic material in their core.

Preparation of support G having a back surface

| Back layer | Coverage |
| --- | --- |
| Gelatin | 2.1 g/m$^2$ |
| Coating solution I-A | 2.0 g/m$^2$ |
| Coating solution I-B | 2.0 g/m$^2$ |
| Sodium dodecylbenzenesulfonate | 80 mg/m$^2$ |
| 1,3-divinylsulfone-2-propanol | 60 mg/m$^2$ |

| Back protective layer | Coverage |
| --- | --- |
| Gelatin | 0.5 g/m$^2$ |
| Polymethyl methacrylate (particle size 7 μm) | 30 mg/m$^2$ |
| Sodium dodecylbenzenesulfonate | 20 mg/m$^2$ |
| Silicone oil | 90 mg/m$^2$ |

A polyethylene terephthalate (PET) film had a moisture-proof subbing layer containing vinylidene chloride on one surface and a hydrophilic gelatin subbing layer on the other surface. The back layer-forming solution was coated onto the gelatin subbing layer of the PET film so as to give an optical density of at least 0.3 at 650 nm.

To the thus prepared support G, each of emulsion layer-forming solutions A to E was coated so as to give a silver coverage of 2.3 g/m$^2$ (dry coating thickness 20 μm).

The emulsion surface protective layer-forming solution was coated on the emulsion surface to a dry thickness of 2 μm, obtaining photosensitive material samples A to E. The samples were measured for surface smoothness or Bekk smoothness by the Oken type smoothness measurement described in J. TAPPI, Paper Pulp Test No. 5. All the samples had a Bekk smoothness of 1,000 seconds on the emulsion side surface and 80 seconds on the back side surface.

It is noted that the tellurium compound 1, disulfide compound 1, comparative dyes 1 and 2, basic dye precursor I-L, and acidic material I-K have the structures shown below.

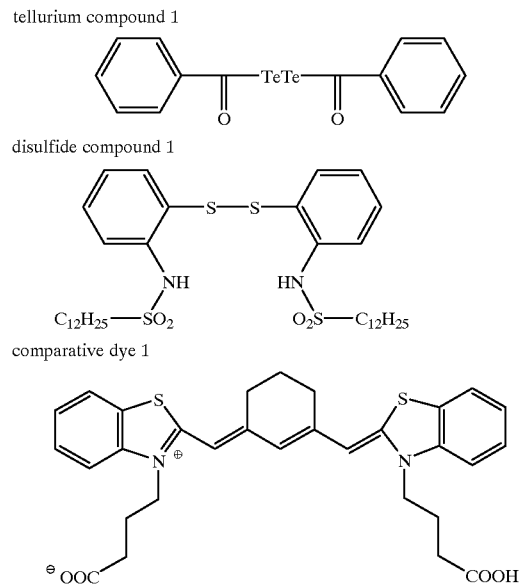

-continued

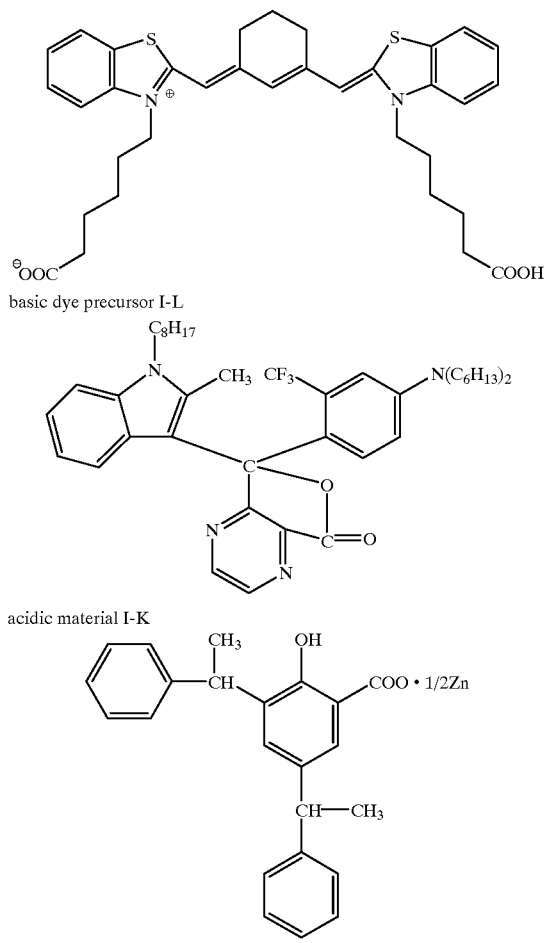

comparative dye 2 basic dye precursor I-L acidic material I-K sealed and placed in a decorative box of 35.1 cm×26.9 cm×3.0 cm, and allowed to age at 50° C. for 5 days (forced aging test). As a reference, samples of the same lot were aged at 4° C. The forcedly aged samples and the reference samples were exposed and developed as in the photographic test and measured for density in a fogged area. Natural aging was evaluated as a fog increase.

Fog increase=[(fog of forcedly aged sample)–(fog of reference sample)]/[maximum density of reference sample)–(density of support)]×100

A lower fog increase indicates better natural aging.

Evaluation of sunlight exposure stability of image

A photosensitive material sample which had been exposed and developed as in the photographic test was attached to the inside surface of a glazing which received sunlight. In this condition, the sample was allowed to stand for one month. After the sunlight exposure test, the image was visually observed and rated according to the following criterion.

⊚: no substantial change

○: slight tone change, but unnoticeable

Δ: discoloration of image, but practically acceptable

X: discoloration of Dmin to increase density to a practically unacceptable level Evaluation of dark heat stability of image A photosensitive material sample which had been exposed and developed as in the photographic test was allowed to stand for one month in a light-shielded condition at 40° C. After the test, the image was visually observed and rated according to the following criterion.

⊚: no substantial change

○: slight tone change, but unnoticeable

Δ: discoloration of image, but practically acceptable

X: discoloration of Dmin to increase density to a practically unacceptable level The results are shown in Table 1.

TABLE 1

| Sample | Sensitizing dye | S | Dmin | Shelf stability | Image stability against light exposure | Image stability against dark heat | Remarks |
|---|---|---|---|---|---|---|---|
| A | D-1 | 100 | 0.18 | 1 | ⊚ | ⊚ | invention |
| B | D-2 | 120 | 0.21 | 2 | ⊚ | ⊚ | invention |
| C | D-3 | 100 | 0.20 | 1 | ⊚ | ⊚ | invention |
| D | comparative dye 1 | 25 | 0.20 | 15 | Δ | Δ | comparison |
| E | comparative dye 1 | 80 | 0.30 | 90 | X | X | comparison |

The thus prepared photosensitive material samples were tested as follows.

Evaluation of photographic properties

A photosensitive material was exposed by means of a laser sensitometer equipped with a 650-nm diode and heated for development at 120° C. for 15 seconds. The resulting image was measured for Dmin and sensitivity (S) by means of a densitometer. Note that the sensitivity is the inverse ok a ratio of the exposure dose providing a density of Dmin+1.0, and it is expressed in a relative value based on a sensitivity of 100 for sample A.

Evaluation of shelf stability

Each photosensitive material sample was allowed to stand for one day at 25° C. and RH 50%. Ten sheets of each sample were contained in a moisture-proof bag, which was It is evident from Table 1 that samples within the scope of the invention have high sensitivity, low Dmin, improved shelf stability and improved image retention.

Example 2

Preparation of organic acid silver emulsion

To 12 liters of water were added 840 grams of behenic acid and 95 grams of stearic acid. To the solution kept at 90° C., a solution of 48 grams of sodium hydroxide and 63 grams of sodium carbonate in 1.5 liters of water was added. The solution was stirred for 30 minutes and then cooled to 50° C. whereupon 1.1 liters of a 1% aqueous solution of N-bromosuccinimide was added. With stirring, 2.3 liters of a 17% aqueous solution of silver nitrate was slowly added. While the solution was kept at 35° C., with stirring, 1.5 liters of a 2% aqueous solution of potassium bromide was added over 2 minutes. The solution was stirred for 30 minutes whereupon 2.4 liters of a 1% aqueous solution of N-bromosuccinimide was added. With stirring, 3,300 grams of a 1.2 wt % butyl acetate solution of polyvinyl acetate was added to the aqueous mixture. The mixture was allowed to stand for 10 minutes, separating into two layers. After the aqueous layer was removed, the remaining gel was washed two times with water. There was obtained a gel-like mixture off silver behenate, silver stearate, and silver bromide, which was dispersed in 1,800 grams of a 2.6% isopropyl alcohol solution of polyvinyl butyral (Denka Butyral #3000-K). The dispersion was further dispersed in 500 grams of polyvinyl butyral (Denka Butyral #4000-2) and 300 grams of isopropyl alcohol, obtaining an organic acid silver salt emulsion of needle grains having a mean minor diameter of 0.05 μm, a mean major diameter of 1.2 μm, and a coefficient of variation of 25%.

Preparation of emulsion layer coating solution

An emulsion layer coating solution W was prepared by adding various chemicals to the above-prepared organic acid silver salt emulsion in amounts per mol of silver. With stirring at 25° C., 10 mg of sodium phenylthiosulfonate, 70 mg of dye D-2, 2 grams of 2-mercapto-5-methylbenzimidazole, 21.5 grams of 4-chlorobenzophenone-2-carboxylic acid, 580 grams of 2-butanone, and 220 grams of dimethylformamide were added to the emulsion, which was allowed to stand for 3 hours. With stirring, there were further added 8 grams of 5-tribromomethylsulfonyl-2-methylthiadiazole, 6 grams of 2-tribromomethylsulfonylbenzothiazole, 5.1 grams of 4,6-ditrichloromethyl-2-phenyltriazine, 2 grams of disulfide compound 1 (identified above), 160 grams of 1,1-bis(2-hydroxy-3,5-dimethylphenyl)-3,5,5-trimethylhexane, 5 grams of tetrachlorophthalic acid, 2.3 grams of hydrazine derivative-a, 1.1 grams of Megafax F-176P, 590 grams of 2-butanone and 10 grams of methyl isobutyl ketone.

Emulsion layer coating solutions X, Y, Z, and R were similarly prepared except that dye D-2 was replaced by an equimolar amount of dyes D-8, D-14, D-30, and comparative dye 1.

Emulsion surface protective layer coating solution

A coating solution was prepared by dissolving 75 grams of CAB 171-15S, 5.7 grams of 4-methylphthalic acid, 1.5 grams of tetrachlorophthalic anhydride, 13 grams of phthalazine, 0.3 grams of Megafax F-176P, 2 grams of Sildex H31 (spherical silica having a mean particle size of 3 μm), and 7 grams of Sumidur N3500 in 3,070 grams of 2-butanone and 30 grams of ethyl acetate.

Preparation of support having a back surface

A polyethylene terephthalate (PET) film of 100 μm thick had a moisture-proof subbing layer containing vinylidene chloride on either surface. A back layer was formed on the film as in Example 1.

To the thus prepared support, each of emulsion layer-forming solutions W, X, Y, Z and R was coated so as to give a silver coverage of 2 g/m² (dry coating thickness 19.5 μm). The emulsion surface protective layer-forming solution was coated on the emulsion surface to a dry thickness of 2 μm, obtaining photosensitive material samples W, X, Y, Z and R.

The hydrazine compound-a used herein is of the following formula.

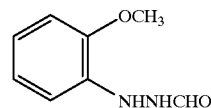

The thus prepared high contrast photosensitive material samples were tested as follows.

Evaluation of photographic properties

A photosensitive material sample was exposed by means of a He—Ne laser sensitometer and heated at 115° C. for 25 seconds for heat development. The resulting image was measured for minimum density (Dmin), sensitivity (S) and gradient (γ) by means of a densitometer. Note that the sensitivity is the inverse of a ratio of the exposure dose providing a density of Dmin+3.0, and it is expressed in a relative value based on a sensitivity of 100 for sample W. Also note that γ is the gradient of a straight line connecting points of density 0.3 and 3.0 on a characteristic curve.

The results are shown in Table 2.

TABLE 2

| Sample | Sensitizing dye | S | Dmin | γ | Remarks |
|---|---|---|---|---|---|
| W | D-2 | 100 | 0.19 | 13 | invention |
| X | D-8 | 100 | 0.20 | 14 | invention |
| Y | D-14 | 110 | 0.18 | 14 | invention |
| Z | D-30 | 120 | 0.20 | 15 | invention |
| R | comparative dye 1 | 30 | 0.30 | 5 | comparison |

It is evident from Table 2 that samples within the scope of the invention have high sensitivity, low Dmin, and high contrast. These samples were also examined for age stability as in Example 1 to find a fog increase of 1 or 2, indicating improved age stability.

There has been described a photothermographic material comprising a cyanine dye of formula (I) and featuring low fog, high sensitivity, high contrast, and improved storage stability both before and after development.

Although some preferred embodiments have been described, many modifications and variations may be made thereto in the light of the above teachings. It is therefore to be understood that within the scope of the appended claims, the invention may be practiced otherwise than as specifically described.

We claim:

1. A photothermographic material comprising at least one layer containing photosensitive silver halide grains, a reducing agent for silver ions, a binder and organic silver salts, on a support, said material further comprising a cyanine dye of formula (I):

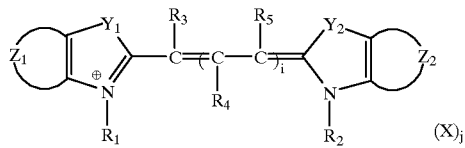

wherein each of $Z_1$ and $Z_2$ is a group of atoms necessary to complete a benzene or naphthalene ring, each of $Y_1$ and $Y_2$ is O, S, Se or NR wherein R is alkyl, each of $R_1$ and $R_2$ is alkyl, each of $R_3$, $R_4$, and $R_5$ is hydrogen or a monovalent substituent, letter i is 0, 1 or 2, when i is 2, two $R_4$ groups may be identical or different or form a 5- or 6-membered ring, taken together, and two $R_5$ groups may be identical or different or form a 5- or 6-membered ring, taken together, X is a counter ion for maintaining a balance of electric charge, letter j is 0 or 1, and at least one member selected from the group consisting of substituents on R, $R_1$, $R_2$, the ring completed by $Z_1$, and the ring completed by $Z_2$, and $R_3$ to $R_5$ has at least one thienyl or arylthio group.

2. The photothermographic material of claim 1, wherein said cyanine dye of formula (I) is represented by formula (Ia):

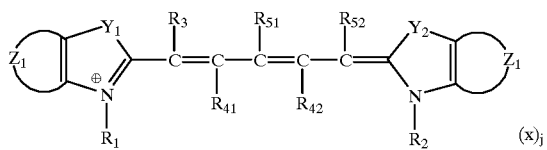

wherein each of $Z_1$ and $Z_2$ is a group of atoms necessary to complete a benzene ring, each of $Y_1$ and $Y_2$ is O, S, Se or NR wherein R is an alkyl group, one of $Y_1$ and $Y_2$ are S, each of $R_1$ and $R_2$ is an unsubstituted alkyl having 2 to 6 carbon atoms or carboxyalkyl, $R_3$, $R_{41}$, $R_{42}$, $R_{51}$ and $R_{52}$ is hydrogen or a monovalent substituent, $R_{41}$ and $R_{42}$ may form a 5- or 6-membered ring, taken together, and $R_{51}$ and $R_{52}$ may form a 5- or 6-membered ring, taken together, X is a counter ion for maintaining a balance of electric charge, letter j is 0 or 1, and at least one member selected from the group consisting of substituents on $R_1$, $R_2$, $Z_1$, $Z_2$, $R_3$, $R_{41}$, $R_{42}$, $R_{51}$ and $R_{52}$ has at least one thienyl or arylthio group.

3. The photothermographic material of claim 2 wherein said substituents $R_{41}$ and $R_{42}$ or $R_{51}$ and $R_{52}$ form a 5- or 6-membered ring.

4. The photothermographic material of claim 2 wherein said at least one member selected from the class consisting of substituents on $Z_1$ and $Z_2$ has at least one thienyl or arylthio group.

5. The photothermographic material of claim 4 wherein each of $Z_1$ and $Z_2$ is a group of atoms to complete a benzene ring having a thienyl or arylthio group.

6. The photothermographic material of claim 1, wherein at least one of said cyanine dyes of formula (I) is present in the amount of $10^{-6}$ to 1 mol per mol of silver halide.

7. The photothermographic material of claim 6, wherein at least one of said cyanine dyes of formula (I) are present in an amount of $10^{-5}$ to $10^{-2}$ mol per mol of silver halide.

8. The photothermographic material of claim 1, wherein the benzene or naphthalene ring completed by $Z_1$ and $Z_2$ is substituted with a substituent selected from the group consisting of thienyl, arylthio, alkyl groups having 1 to 6 carbon atoms, substituted phenyl groups having 6 to 10 carbon atoms, phenyl groups, alkoxy groups having 1 to 6 carbon atoms, alkylthio groups having 1 to 6 carbon atoms, sulfonyl groups having 1 to 8 carbon atoms, and halogen atoms.

9. The photothermographic material of claim 1, wherein the alkyl group represented by $R_1$ and $R_2$ is substituted or unsubstituted straight chain, branched or cyclic alkyl groups having 1 to 22 carbon atoms wherein the substituents are selected from the group consisting of thienyl, arylthio, halogen atoms, hydroxy groups, carboxy groups, carboxylate groups, sulfo groups, sulfonate groups, alkoxycarbonyl groups having 2 to 20 carbon atoms, acyl groups having 2 to 20 carbon atoms, acyloxy groups having 2 to 20 carbon atoms, carboxylic acid amide groups having 1 to 20 carbon atoms, carbamoyl groups having 1 to 20 carbon atoms, alkoxy groups having 1 to 20 carbon atoms, substituted phenyl groups having 6 to 10 carbon atoms, phenyl groups, alkylthio groups having 1 to 20 carbon atoms, and aryloxy groups having 6 to 20 carbon atoms.

10. The photothermographic material of claim 1, wherein the monovalent substituent is selected from the group consisting of alkyl groups having 1 to 8 carbon atoms, alkoxy groups having 1 to 8 carbon atoms, phenyl groups, substituted phenyl groups having 6 to 10 carbon atoms, phenoxy groups, substituted phenoxy groups having 6 to 10 carbon atoms, aralkyl groups having 7 to 11 carbon atoms, amino groups, substituted amino groups, and nitrogenous heteroaromatic ring groups.

11. The photothermographic material of claim 1, wherein the counter ion is a cation selected from the group consisting of $Na^+$, $K^+$, $NH_4^+$, $(n-C_4H_9)_4N^+$, and N-ethylpyridinium, or an acid anion selected from the group consisting of chloride, bromide, iodide, tetrafluoroborate, hexafluorophosphate, methylsulfate, ethylsulfate, 4-methyl-benzensulfonate, 4-chlorobenzenesulfonate, benzenesulfonate, methanesulfonate, and trifluoromethanesulfonate.

12. The photothermographic material of claim 1, wherein the compound of Formula (I) is a pentamethine cyanine dye wherein each of $Z_1$ and $Z_2$ is a group of atoms to complete a benzene ring having a thienyl or arylthio group, one of $Y_1$ and $Y_2$ is S and the other is O or S, or both $Y_1$ and $Y_2$ are S, each of $R_1$ and $R_2$ is an unsubstituted alkyl group having 2 to 6 carbon atoms or carboxyalkyl, and i is 2.

13. The photothermographic material of claim 1, wherein the thienyl group is 2-thienyl or 3-thienyl.

14. The photothermographic material of claim 1, wherein the arylthio group is phenylthio.

15. A method for forming an image, which comprises, exposing spectrally the photothermographic material of claim 1 to a red laser beam in the wavelength region of 600 to 700 nm, and heating said photothermographic material in order to form an image.

* * * * *

UNITED STATES PATENT AND TRADEMARK OFFICE
CERTIFICATE OF CORRECTION

PATENT NO. : 5,998,125
DATED : December 7, 1999
INVENTOR(S) : Inagaki et al.

It is certified that error appears in the above-indentified patent and that said Letters Patent is hereby corrected as shown below:

In column 37, line 10, delete "and".

In column 37, delete the formula in line 20, and insert the following formula therefor:

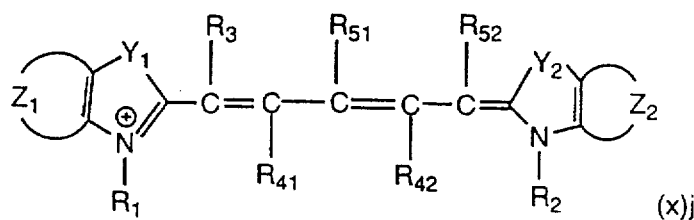

Signed and Sealed this

Tenth Day of April, 2001

Attest:

NICHOLAS P. GODICI

Attesting Officer

Acting Director of the United States Patent and Trademark Office